(12) United States Patent
Yoshida et al.

(10) Patent No.: US 12,067,298 B2
(45) Date of Patent: Aug. 20, 2024

(54) MEMORY SYSTEM SUPPORTING REDUNDANT LOGICAL DOMAIN

(71) Applicant: KIOXIA CORPORATION, Tokyo (JP)

(72) Inventors: Hideki Yoshida, Yokohama Kanagawa (JP); Shinichi Kanno, Tokyo (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 17/898,390

(22) Filed: Aug. 29, 2022

(65) Prior Publication Data

US 2023/0297290 A1    Sep. 21, 2023

(30) Foreign Application Priority Data

Mar. 16, 2022   (JP) .................. 2022-041507

(51) Int. Cl.
    *G06F 3/06*    (2006.01)
(52) U.S. Cl.
    CPC ............ *G06F 3/0665* (2013.01); *G06F 3/061* (2013.01); *G06F 3/0659* (2013.01); *G06F 3/0688* (2013.01)
(58) Field of Classification Search
    CPC ...... G06F 3/061; G06F 3/0659; G06F 3/0665; G06F 3/0688; G06F 3/065
    See application file for complete search history.

(56) References Cited

U.S. PATENT DOCUMENTS

| | | | |
|---|---|---|---|
| 6,041,366 A * | 3/2000 | Maddalozzo, Jr. ... | G06F 13/385 710/5 |
| 8,645,664 B1 | 2/2014 | Colgrove et al. | |
| 10,185,624 B2 | 1/2019 | Akutsu et al. | |
| 2008/0147962 A1* | 6/2008 | Diggs ................ | G06F 11/2094 711/E12.008 |
| 2010/0023715 A1* | 1/2010 | Jibbe .................. | G06F 11/1441 711/E12.103 |
| 2018/0121121 A1* | 5/2018 | Mehra ..................... | G06F 3/061 |
| 2019/0087323 A1 | 3/2019 | Kanno et al. | |
| 2021/0042246 A1* | 2/2021 | Yoshida .............. | G06F 13/1668 |
| 2021/0117443 A1 | 4/2021 | Zheng et al. | |

FOREIGN PATENT DOCUMENTS

| | | |
|---|---|---|
| JP | 6200886 B2 | 9/2017 |
| JP | 2019-057151 A | 4/2019 |
| JP | 2021-089764 A | 6/2021 |
| WO | 2013/023200 A1 | 2/2013 |

* cited by examiner

*Primary Examiner* — Larry T Mackall
(74) *Attorney, Agent, or Firm* — Kim & Stewart LLP

(57) ABSTRACT

A memory system includes a nonvolatile memory including memory dies, and a controller. The controller is configured to create a first virtual storage with a first part of the memory dies and a second virtual storage with a second part of the memory dies, and create a redundant logical domain spanning one or more memory dies corresponding to the first virtual storage and one or more memory dies corresponding to the second virtual storage. The memory controller is configured to, in response to a write command, store write data corresponding to the write command in a first region of the first virtual storage and in a second region of the second virtual storage, and return to the host a response including a first physical address of the first region and a second physical address of the second region.

15 Claims, 19 Drawing Sheets

FIG. 12

VIRTUAL DEVICE CREATION COMMAND

|  | DESCRIPTION |
|---|---|
| VIRTUAL DEVICE ID | IDENTIFIER OF VIRTUAL DEVICE TO BE CREATED |
| START CHANNEL | INITIAL CHANNEL CORRESPONDING TO VIRTUAL DEVICE TO BE CREATED |
| START BANK | INITIAL BANK CORRESPONDING TO VIRTUAL DEVICE TO BE CREATED |
| NUMBER OF CHANNELS | NUMBER OF CHANNELS INCLUDED IN VIRTUAL DEVICE TO BE CREATED |
| NUMBER OF BANKS | NUMBER OF BANKS INCLUDED IN VIRTUAL DEVICE TO BE CREATED |

FIG. 13

QoS DOMAIN CREATION COMMAND

|  | DESCRIPTION |
|---|---|
| QoS DOMAIN ID | IDENTIFIER OF QoS DOMAIN TO BE CREATED |
| VIRTUAL DEVICE ID | IDENTIFIER OF VIRTUAL DEVICE USED BY QoS DOMAIN TO BE CREATED (PLURALITY OF VIRTUAL DEVICE IDS ARE CAPABLE OF BEING DESIGNATED) |
| CAPACITY | CAPACITY OF QoS DOMAIN TO BE CREATED (CAPACITY IS DESIGNATED BY NUMBER OF DATA UNITS SUCH AS SECTOR) |
| SECTOR SIZE | SIZE OF SECTOR USED IN QoS DOMAIN TO BE CREATED |

FIG. 14

WRITE COMMAND

| | DESCRIPTION |
|---|---|
| QoS DOMAIN ID | IDENTIFIER OF QoS DOMAIN INTO WHICH DATA IS TO BE WRITTEN |
| USER ADDRESS | IDENTIFIER OF DATA TO BE WRITTEN (USER ADDRESS IS, FOR EXAMPLE, LBA) |
| DATA SIZE | SIZE OF DATA TO BE WRITTEN |
| DATA POINTER | LOCATION WHERE DATA TO BE WRITTEN IS STORED IN HOST WRITE BUFFER |

FIG. 15

PHYSICAL ADDRESS NOTIFICATION

| | DESCRIPTION |
|---|---|
| QoS DOMAIN ID | IDENTIFIER OF QoS DOMAIN INTO WHICH DATA IS WRITTEN |
| USER ADDRESS | IDENTIFIER OF DATA TO BE WRITTEN (USER ADDRESS IS, FOR EXAMPLE, LBA) |
| PHYSICAL ADDRESSES PBA#1 TO PBA#n | n PHYSICAL ADDRESSES INDICATING n PHYSICAL STORAGE LOCATIONS, RESPECTIVELY, IN n VIRTUAL DEVICES INTO WHICH DATA IS WRITTEN |
| DATA SIZE | SIZE OF DATA WRITTEN |

FIG. 16

READ COMMAND

| | DESCRIPTION |
|---|---|
| QoS DOMAIN ID | IDENTIFIER OF QoS DOMAIN IN WHICH DATA TO BE READ IS STORED |
| PHYSICAL ADDRESS | ADDRESS INDICATING PHYSICAL STORAGE LOCATION IN WHICH DATA TO BE READ IS STORED |
| DATA SIZE | SIZE OF DATA TO BE READ |
| USER ADDRESS | USER ADDRESS IS, FOR EXAMPLE, LBA CORRESPONDING TO DATA TO BE READ |
| DATA POINTER | LOCATION TO WHICH DATA TO BE READ IS TO BE TRANSFERRED IN HOST READ BUFFER |

FIG. 21

LUT 201

| | | | |
|---|---|---|---|
| LBA0 | PBA10 | PBA100 | ... |
| LBA1 | PBA11 | PBA101 | ... |
| LBA2 | PBA12 | PBA102 | ... |
| LBA3 | PBA30 | PBA300 | ... |
| LBA4 | PBA31 | PBA301 | ... |
| LBA5 | PBA32 | PBA302 | ... |
| ⋮ | ⋮ | ⋮ | ⋮ |
| LBAn | | | |

MEMORY SYSTEM SUPPORTING REDUNDANT LOGICAL DOMAIN

CROSS-REFERENCE TO RELATED APPLICATION(S)

This application is based upon and claims the benefit of priority from Japanese Patent Application No. 2022-041507, filed Mar. 16, 2022, the entire contents of which are incorporated herein by reference.

FIELD

Embodiments described herein relate generally to a technique for controlling a non-volatile memory.

BACKGROUND

Memory systems each including a non-volatile memory are widely used. As one of such memory systems, a solid state drive (SSD) including a NAND flash memory is known.

When data is written into a storage device such as an SSD, identical data may be written into a plurality of storage locations of the storage device for ensured data storage, which is called data redundancy.

In an implementation to achieve the data redundancy, there is a method for providing in a host an address translation table that translates a logical address to logical addresses of a plurality of write destinations of a storage device and providing in the storage device an address translation table that translates the logical addresses to corresponding physical addresses. According to such a method, double address translation, that is, address translation on the host side and address translation on the device side, is required. However, such double address translation may reduce the I/O performance of the entire system including the host and the storage device.

BRIEF DESCRIPTION OF THE DRAWINGS

FIG. 12 is a diagram illustrating a virtual device creation command issued to the memory system according to the embodiment.

FIG. 13 is a diagram illustrating a QoS domain creation command issued to the memory system according to the embodiment.

FIG. 14 is a diagram illustrating a write command issued to the memory system according to the embodiment.

FIG. 15 is a diagram illustrating a physical address notification used in the memory system according to the embodiment.

FIG. 16 is a diagram illustrating a read command issued to the memory system according to the embodiment.

FIG. 21 is a diagram illustrating a configuration example of an address translation table managed by the host.

DETAILED DESCRIPTION

Embodiments provide a memory system and a control method capable of improving data reliability and I/O performance.

In general, according to an embodiment, a memory system includes a nonvolatile memory including a plurality of memory dies, and a controller. The controller is configured to create a first virtual storage with a first part of the memory dies and a second virtual storage with a second part of the memory dies, and create a redundant logical domain spanning one or more memory dies corresponding to the first virtual storage and one or more memory dies corresponding to the second virtual storage. The memory controller is configured to, in response to a write command designating the redundant logical domain from a host, store write data corresponding to the write command in a first region of the first virtual storage and in a second region of the second virtual storage, and return to the host a response including a first physical address of the first region and a second physical address of the second region.

Hereinafter, an embodiment will be described with reference to the drawings.

Figure 1:
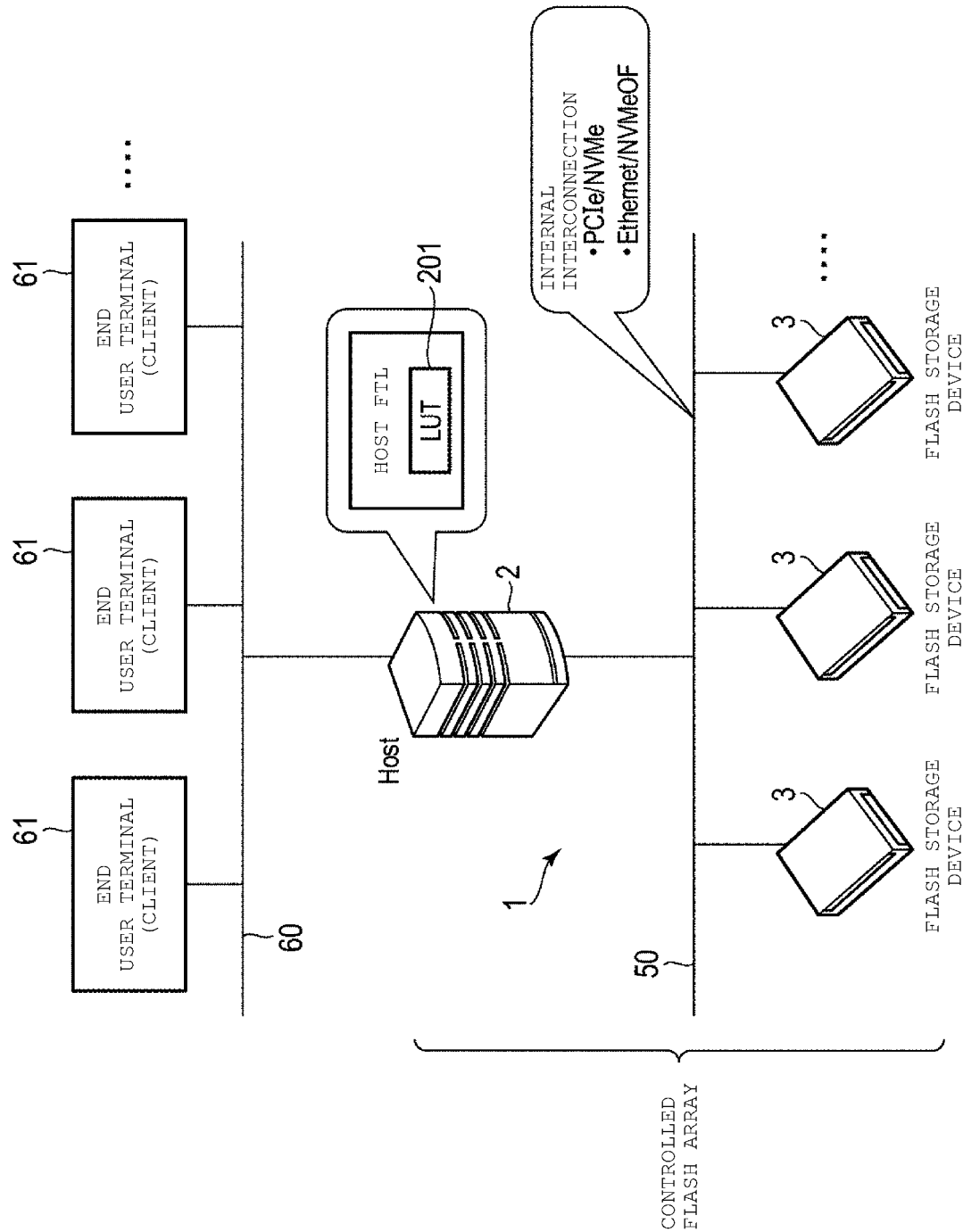
FIG. 1 is a block diagram illustrating a configuration example of an information processing system including a memory system according to an embodiment.

FIG. 1 is a block diagram illustrating a configuration of an information processing system 1 including a memory system according to an embodiment. The information processing system 1 includes a memory system according to the embodiment and a host 2. The memory system according to the embodiment is a semiconductor storage device configured to write data to a non-volatile memory and read data from the non-volatile memory. The memory system is implemented as, for example, one or more flash storage devices 3, each including a NAND flash memory.

In FIG. 1, the host (may be referred to as a host device) 2 is configured to control a plurality of flash storage devices 3. The host 2 is implemented by an information processing apparatus configured to use a flash array including the plurality of flash storage devices 3 as a storage. This information processing apparatus is, for example, a personal computer or a server computer.

Hereinafter, a case where the information processing apparatus such as the server computer functions as the host 2 will be illustrated.

The host 2 and the plurality of flash storage devices 3 are interconnected via an interface 50 (i.e., internal interconnection). The interface 50 for this interconnection is not limited thereto, but PCI Express (PCIe)®, NVM Express (NVMe)®, Ethernet®, NVMe over Fabrics (NVMeOF), and the like may be used.

A typical example of the server computer that functions as the host 2 is a server computer (hereinafter, referred to as a server) in a data center.

In the case where the host 2 is implemented by the server in the data center, the host 2 may be connected to a plurality of end user terminals (may be referred to as clients) 61 via a network 60. The host 2 can provide various services to these end user terminals 61.

Examples of the services that can be provided by the host 2 include (1) platform as a service (PaaS) that provides a system operating platform to each client (each end user terminal 61), (2) infrastructure as a service (IaaS) that provides such an infrastructure such as a virtual server to each client (each end user terminal 61), and the like.

A plurality of virtual machines may be emulated on a physical server that functions as this host 2. Each of these virtual machines running on the host 2 can function as a virtual server configured to provide various services to the client (i.e., end user terminal 61) corresponding to the virtual machine. In each virtual machine, an operating system and a user application used by the end user terminal 61 corresponding to this virtual machine is executed.

In the host 2, a flash translation layer (may be referred to as host FTL) is also executed. This host FTL includes a look-up table (LUT) 201, which is an address translation table. The LUT 201 stores mapping information which is information indicating a correspondence relationship between each user address for identifying data to be accessed and each physical address of the non-volatile memory in the flash storage device 3. With this LUT 201, the host FTL can know data allocation on the non-volatile memory in the flash storage device 3.

The flash storage device 3 includes the non-volatile memory such as a NAND flash memory. The non-volatile memory includes a plurality of blocks. Each of the blocks includes a plurality of pages. Each of these blocks is a unit of a data erase operation for erasing data. Each of the pages is a unit of a data write operation and a data read operation.

The flash storage device 3 can execute low-level abstraction. The low-level abstraction is a function for abstraction of the non-volatile memory. The low-level abstraction includes functions of assisting the data allocation and the like. Examples of the functions of assisting the data allocation include a function of managing a die group, a function of managing a logical area, a function of assigning a write destination block into which user data from the host 2 is to be written, and a function of determining a write destination location (write destination block or a location in this write destination block) of the user data, a function of notifying the host 2 of this write destination location (block address or intra-block offset) where user data is written, and the like.

The die group is a set of one or more non-volatile memory dies among a plurality of non-volatile memory dies provided in the non-volatile memory. One or a plurality of logical areas are created in one die group. The logical area is a logical storage area used by the host 2 to access the flash storage device 3. Hereinafter, the die group is referred to as a virtual device (VD) or a virtual storage device, and the logical area is referred to as a quality of service (QoS) domain.

The flash storage device 3 executes various commands received from the host 2. These commands include a write command, which is a command for writing data to the non-volatile memory in the flash storage device 3, and a read command, which is a command for reading data from the non-volatile memory. In the present embodiment, the read command designates a physical address indicating a storage location from which data is to be read. This physical address is represented by a block address of a block to be read and an offset (e.g., intra-block offset) indicating a storage location of the block to be read.

Figure 2:
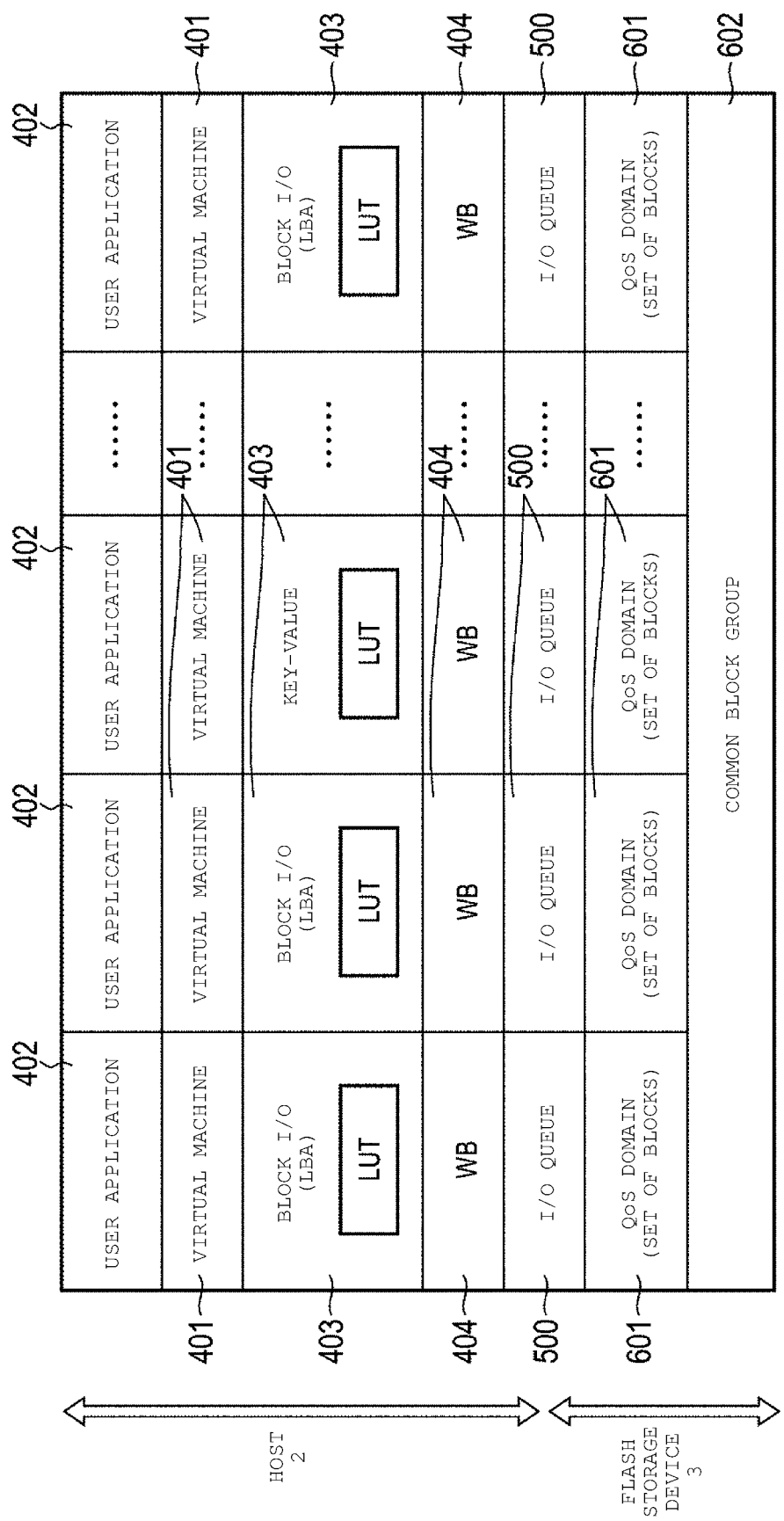
FIG. 2 is a diagram illustrating division of roles between the memory system and a host according to the embodiment.

FIG. 2 is a diagram illustrating division of roles between the flash storage device 3 and the host 2.

In the host 2, a plurality of virtual machines 401 corresponding to a plurality of end users are emulated. An operating system and a user application 402 used by the corresponding end user are executed in each virtual machine 401.

In the host 2, a plurality of I/O services 403 corresponding to the plurality of user applications 402, respectively, are performed. These I/O services 403 may include logical block address (LBA)-based block I/O services, key-value store services, and the like. Each I/O service 403 includes a look-up table (LUT) that manages mapping between each user address and each physical address of the flash storage device 3.

Here, the user address means an identifier that can identify data to be accessed. A typical example of the user address is a logical address such as a logical block address (LBA). Alternatively, a key in a key-value store, a hash value of this key, or the like may be used as the user address.

The physical address of the flash storage device 3 is an address for specifying a storage location (physical storage location) of the non-volatile memory provided in the flash storage device 3.

In the LBA-based block I/O service, a LUT that stores mapping information indicating a correspondence relationship between each LBA and each physical address of the flash storage device 3 may be used.

On the other hand, in the key-value store service, an LUT that stores mapping information indicating a correspondence relationship between each key (or each hash value of the key), each physical address of the flash storage device 3 that stores each data corresponding to this key, and each data length of each data corresponding to this key, may be used.

Each end user can select an addressing method to be used (e.g., LBA, key in key-value store, hash value of this key, and the like).

In the host 2, a plurality of write buffers (WBs) 404 corresponding to the plurality of virtual machines 401, respectively, may be managed. Write data from a certain user application 402 may be temporarily stored in the write buffer (WB) 404 for the virtual machine 401 corresponding to the user application 402.

The transmission of a command from the host 2 to the flash storage device 3 and the return of a response about the command completion from the flash storage device 3 to the host 2 are executed via an I/O queue 500 in the host 2 and an I/O queue 500 in the flash storage device 3.

The flash storage device 3 manages, as a QoS domain 601, each of a plurality of logical areas obtained by logically dividing the non-volatile memory in the flash storage device 3. The QoS domain 601 is basically created in one virtual device. One QoS domain 601 may be created in one virtual device and the plurality of QoS domains 601 may be created in one virtual device. In the present embodiment, a redundant QoS domain is also used. The redundant QoS domain is a logical area that spans a plurality of virtual devices.

Each of the QoS domains 601 is a subset of a plurality of blocks included in the non-volatile memory. Each of the plurality of blocks included in the non-volatile memory belongs to only one QoS domain 601. The same block does not simultaneously belong to different QoS domains 601. When a first QoS domain and a second QoS domain are created in one virtual device, one block of a set of blocks included in one virtual device is assigned as a write destination block for the first QoS domain. Another block of the set of blocks included in the virtual device is assigned as a write destination block for the second QoS domain. Accordingly, data from different QoS domains will not be mixed in the same block.

Each QoS domain 601 is identified by an identifier called a QoS domain ID. The QoS domain ID is used as an identifier for accessing the QoS domain.

In the present embodiment, a write command designates an identifier (e.g., QoS domain ID) of a logical area (e.g., QoS domain) into which data is to be written. When a write command designating a certain QoS domain ID is received from the host 2, the flash storage device 3 selects a block from a common block group 602, which is a set of blocks (free blocks) included in a virtual device to be used by the designated QoS domain, and assigns the selected block as a write destination block for this QoS domain. Here, the write destination block means a block into which data is to be written. The free block means a block in a state (i.e., free state) that can be reused (or reassigned) as a new write destination block. A typical example of the free block is a block that does not store valid data. The valid data means latest data associated with a logical address such as LBA. That is, data linked as the latest data from the LUT 201 of the host 2 is valid data. Invalid data means data that is not associated with a logical address such as LBA. Data not linked from the LUT 201 of the host 2 is invalid data. For example, when update data corresponding to a certain LBA is written into the flash storage device 3, previous data corresponding to this LBA becomes invalid data.

The flash storage device 3 writes data associated with the received write command to the write destination block assigned for this QoS domain. When an available write destination block is previously assigned for this QoS domain, it is not necessary to perform the above operation of assigning one block (free block) in the common block group 602 as the write destination block for this QoS domain. The flash storage device 3 writes the data associated with the received write command to a next available page in this previously assigned write destination block.

When the data associated with the received write command is written into the write destination block, the flash storage device 3 notifies the host 2 of an LBA of this data and a physical address (e.g., block address and intra-block offset) indicating a storage location of the non-volatile memory into which this data is written. The block address is an address that can uniquely specify each block. Since the non-volatile memory usually includes the plurality of non-volatile memory dies, a block address of a certain block may be represented by a die ID of the non-volatile memory die and a block ID of a block in the die. The intra-block offset is an offset address that can uniquely specify each storage location included in the block.

Upon receiving the notification indicating the physical address from the flash storage device 3, the host 2 updates the LUT 201 such that a logical address of this data is associated with a physical address (block address and intra-block offset) where this data is written.

Figure 3:
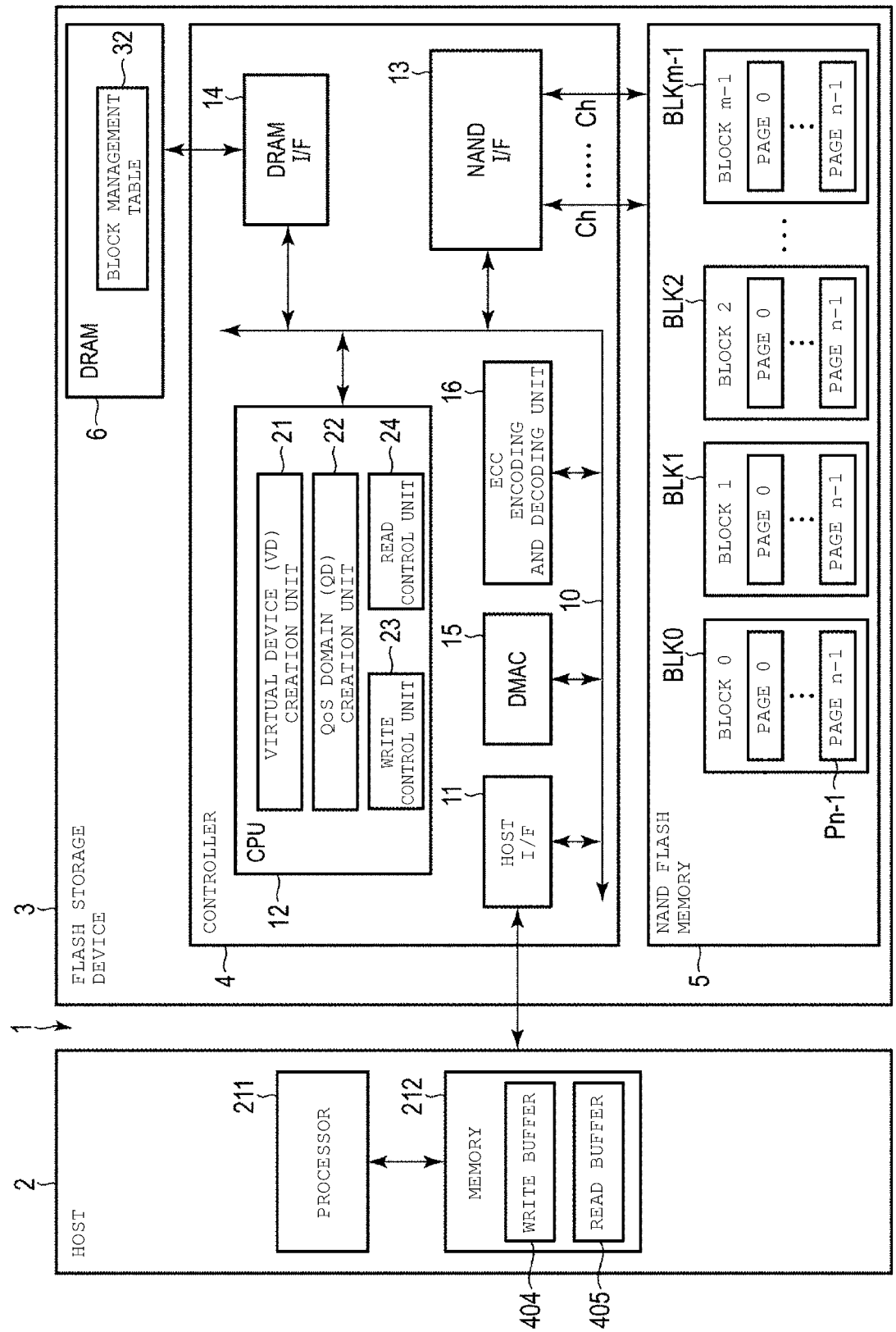
FIG. 3 is a block diagram illustrating a configuration example of the memory system and a configuration example of the host according to the embodiment.

Next, a configuration of the flash storage device 3 will be described. FIG. 3 is a block diagram illustrating a configuration example of the host 2 and a configuration example of the flash storage device 3 according to the present embodiment.

The host 2 includes a processor 211 and a memory 212. The processor 211 is, for example, a central processing unit (CPU). The processor 211 is configured to control an operation of each component of the host 2. The processor 211 executes software (may be referred to as host software) loaded from the flash storage device 3 into the memory 212. The host 2 may include a storage device other than the flash storage device 3. In this case, the host software may be loaded into the memory 212 from other storage devices. The host software includes operating systems, file systems, device drivers, application programs, and the like. The memory 212 is a main memory provided in the host 2. The memory 212 is a volatile semiconductor memory. The memory 212 is implemented by, for example, a random access memory such as a dynamic random access memory (DRAM). The memory 212 is a write buffer 404 which is a memory area where write data to be written into the flash storage device 3 is temporarily stored, and a read buffer 405 which is a memory area where read data transferred from the flash storage device 3 is temporarily stored.

The flash storage device 3 includes a controller 4 and a non-volatile memory (e.g., NAND flash memory) 5. The flash storage device 3 may also include a random access memory, for example, a DRAM 6.

The NAND flash memory 5 includes a memory cell array including a plurality of memory cells arranged in a matrix configuration. The NAND flash memory 5 may be a flash memory having a two-dimensional structure or a flash memory having a three-dimensional structure.

The memory cell array of the NAND flash memory 5 includes a plurality of blocks BLK0 to BLKm−1. Each of the blocks BLK0 to BLKm−1 includes a plurality of pages (here, pages P0 to Pn−1). Each of the blocks BLK0 to BLKm−1 function as an erasing unit. The blocks may be referred to as "physical blocks" or "flash blocks". Each of the pages P0 to Pn−1 is a unit of a data write operation and a data read operation.

The controller 4 is electrically connected to the NAND flash memory 5 which is the non-volatile memory via a NAND interface 13 such as a Toggle NAND flash interface and an open NAND flash interface (ONFI). The controller 4 operates as a memory controller configured to control the NAND flash memory 5. The controller 4 may be implemented by a circuit such as a system-on-a-chip (SoC).

Figure 4:
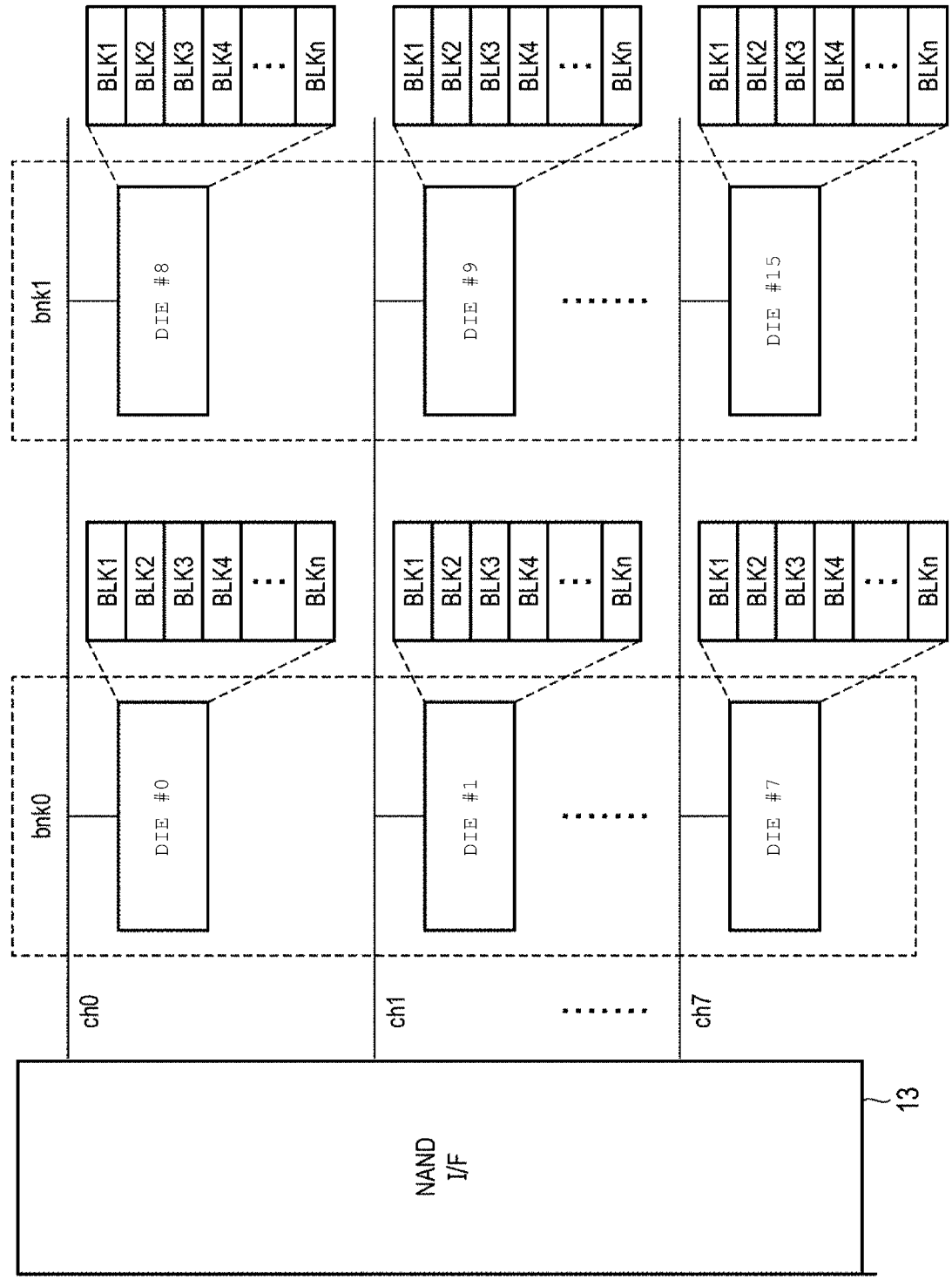
FIG. 4 is a block diagram illustrating a relationship between a NAND interface and a plurality of NAND flash memory dies provided in the memory system according to the embodiment.

As illustrated in FIG. 4, the NAND flash memory 5 includes a plurality of NAND flash memory dies (e.g., NAND flash memory chips). The individual NAND flash memory dies can operate separately. FIG. 4 illustrates a case where eight channels ch0 to ch7 are connected to the NAND interface 13 and two NAND flash memory dies are connected to each of the eight channels ch0 to ch7. Two NAND flash memory dies connected to the same channel are divided into two banks bnk0 and bnk1. Eight NAND flash memory dies #0 to #7 connected to the channels ch0 to ch7 constitute bank bnk0. The remaining eight NAND flash memory dies #8 to #15 connected to the channels ch0 to ch7 constitute bank bnk1.

The data erase operation may be executed in units of one block (physical block), or may be executed in units of a block group (superblock) including a set of a plurality of physical blocks capable of operating in parallel. One block group (one superblock) may include, but is not limited to, a total of 16 physical blocks selected one by one from the NAND flash memory dies #0 to #15. Each of the NAND flash memory dies #0 to #15 may have a multi-plane configuration. For example, when each of the NAND flash memory dies #0 to #15 has a multi-plane configuration including two planes, one superblock may include a total of 32 physical blocks selected one by one from 32 planes corresponding to the NAND flash memory dies #0 to #15.

Figure 5:
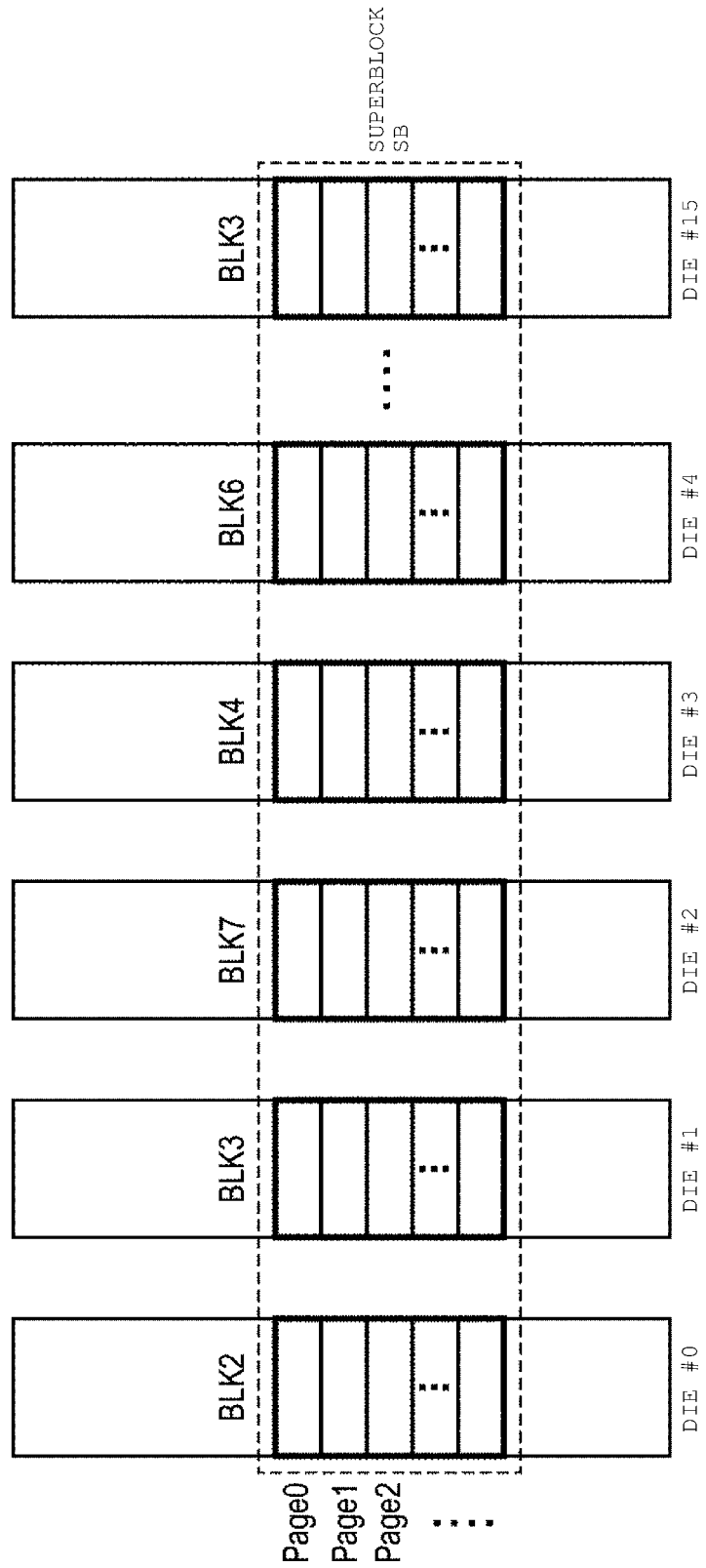
FIG. 5 is a diagram illustrating a configuration example of one superblock including a plurality of physical blocks used in the memory system according to the embodiment.

FIG. 5 illustrates one superblock (SB) including 16 physical blocks (here, the physical block BLK2 in the NAND flash memory die #0, the physical block BLK3 in the NAND flash memory die #1, the physical block BLK7 in the NAND flash memory die #2, the physical block BLK4 in the NAND flash memory die #3, the physical block BLK6 in the NAND flash memory die #4, . . . , and the physical block BLK3 in the NAND flash memory die #15).

The write destination block may be one physical block or one superblock. A configuration in which one superblock includes only one physical block may be used, and in this case, one superblock is equivalent to one physical block.

Next, a configuration of the controller 4 in FIG. 3 will be described.

The controller 4 includes a host interface (I/F) 11, a CPU 12, a NAND interface (I/F) 13, a DRAM interface (I/F) 14, a direct memory access controller (DMAC) 15, an ECC encoding and decoding unit 16, and the like. The host interface 11, the CPU 12, the NAND interface 13, the DRAM interface 14, the DMAC 15, and the ECC encoding and decoding unit 16 are interconnected via a bus 10.

The host interface 11 is a host interface circuit configured to perform communication with the host 2. The host interface 11 may be, for example, a PCIe controller (or NVMe controller). Alternatively, in a configuration in which the flash storage device 3 is connected to the host 2 via Ethernet®, the host interface 11 may be an NVMe over Fabrics (NVMeOF) controller.

The host interface 11 receives various commands from the host 2. These commands include a virtual device creation command, a QoS domain creation command, a write command, a read command, and the like.

The CPU 12 is a processor configured to control the host interface 11, the NAND interface 13, the DRAM interface 14, the DMAC 15, and the ECC encoding and decoding unit 16. The CPU 12 performs various kinds of processing by loading a control program (e.g., firmware) from the NAND flash memory 5 or a ROM (not illustrated) into the DRAM 6 according to supply of power to the flash storage device 3 and executing the firmware. The firmware may be loaded on an SRAM (not illustrated) in the controller 4. The CPU 12 can execute command processing and the like for executing various commands from the host 2. An operation of the CPU 12 is controlled by the above firmware executed by the CPU 12. A part or all of the command processing may be executed by a hardware in the controller 4.

The NAND interface 13 is a memory control circuit configured to control the NAND flash memory 5 under the control of the CPU 12.

The DRAM interface 14 is a DRAM control circuit configured to control the DRAM 6 under the control of the CPU 12. A storage area of the DRAM 6 is used to store a block management table 32. The storage area of the DRAM 6 may also be used as an internal buffer for temporarily storing write data and the like. The flash storage device 3 may have a buffer-less configuration in which the internal buffer is not present in the flash storage device 3 or a capacity of the internal buffer is close to substantially zero.

The block management table 32 includes a plurality of management tables corresponding to the plurality of blocks in the NAND flash memory 5, respectively. Each management table is used to store management information (e.g., metadata) for managing the block corresponding to this management table. The metadata is, for example, bitmap data. The bitmap data includes a plurality of bits corresponding to a plurality of storage locations included in the block, respectively. Each of the plurality of bits indicates whether data stored in the corresponding storage location is valid data or invalid data. The metadata may include information indicating the number of rewrites (the number of programs or erase cycles), an open or close state, a write destination page range, and the like. The open or close state indicates whether this block is in an open state or a close state. The open state is a state where this block is in use as a write destination block. The close state is a state where the block is filled with data and is managed as an active block. The write destination page range indicates from which page to which page the write (e.g., program) is currently in operation.

Under the control of the CPU 12, the DMAC 15 executes data transfer between the memory 212 (more specifically, the write buffer 404) in the host 2 and the DRAM 6 (i.e., internal buffer), and data transfer between the memory 212 (more specifically, the read buffer 405) in the host 2 and the DRAM 6. When write data is to be transferred from the write buffer 404 of the host 2 to the internal buffer, the CPU 12 designates, for the DMAC 15, a transfer source address indicating a location on the write buffer 404, a data size, and a transfer destination address indicating a location on the internal buffer. When read data is to be transferred from the internal buffer to the read buffer 405 of the host 2, the CPU 12 designates, for the DMAC 15, a transfer source address indicating a location on the internal buffer, a data size, and a transfer destination address indicating a location on the read buffer 405.

The ECC encoding and decoding unit 16 executes encoding processing for adding an error correction code (ECC) to the data written into the NAND flash memory 5. When data is read from the NAND flash memory 5, the ECC encoding and decoding unit 16 executes decoding processing for performing error correction of the read data by using the ECC included in the read data.

Next, a functional configuration of the CPU 12 will be described. The CPU 12 can function as a virtual device (VD) creation unit 21, a QoS domain (QD) creation unit 22, a write control unit 23, and a read control unit 24. A part or all of the virtual device (VD) creation unit 21, the QoS domain (QD) creation unit 22, the write control unit 23, and the read control unit 24 may be implemented by hardware in the controller 4 different from the CPU 12.

The virtual device (VD) creation unit 21 manages a plurality of virtual devices VD. One virtual device VD is a die group including one or more NAND flash memory dies among the plurality of NAND flash memory dies #0 to #15. Hereinafter, the NAND flash memory die is simply referred to as a die. Each of the dies #0 to #15 is included in only one virtual device VD, and each of the dies #0 to #15 is not shared among the plurality of virtual devices VD.

In response to receiving a virtual device creation command, which is a command for creating a virtual device, from the host 2, the virtual device (VD) creation unit 21 creates a die group including one or more dies designated by the virtual device creation command. Whenever the virtual device creation command is received from the host 2, the virtual device (VD) creation unit 21 creates a virtual device. Accordingly, a plurality of virtual devices including different dies are created. The plurality of created virtual devices are managed by the controller 4. The virtual devices are used to implement hardware-based isolation for preventing die contention.

The QoS domain (QD) creation unit 22 manages a plurality of QoS domains. The QoS domain is a logical storage area designated by host 2. The QoS domain may be a namespace. The namespace is a set of consecutive logical addresses.

The QoS domain is created on one virtual device. When a certain QoS domain is designated by a write command from the host 2, the virtual device included in the designated QoS domain is accessed. A plurality of QoS domains may be created in one virtual device. In this case, each of the blocks included in the virtual device is assigned, as a write destination block, to only one QoS domain. The write destination block is not shared between the QoS domains.

In response to receiving a QoS domain creation command, which is a command for creating a logical storage area, from the host 2, the QoS domain (QD) creation unit 22 creates a QoS domain including a virtual device designated by the QoS domain creation command. Whenever the QoS domain creation command is received from the host 2, the QoS domain (QD) creation unit 22 creates the QoS domain. As a result, a plurality of QoS domains are created. The plurality of created QoS domains are managed by the controller 4. The QoS domains are used to implement software-based isolation for preventing die contention.

In the present embodiment, a redundant QoS domain is used to write data and one or more replicated data thereof to the NAND flash memory 5. The redundant QoS domain is a logical storage area that spans a plurality of virtual devices. When data is written into the redundant QoS domain, this data is written into each of a plurality of virtual devices included in the redundant QoS domain.

The write control unit 23 executes the following data write operation in response to receiving the write command from the host 2. The write command includes parameters that designate a QoS domain identifier (e.g., QoS domain ID), a user address (e.g., logical address such as LBA), and the like.

The write control unit 23 identifies the virtual device used by the QoS domain having the QoS domain ID designated by the received write command. The write control unit 23 selects a block from a set of blocks included in the specified virtual device. The write control unit 23 assigns the selected block as a write destination block for the QoS domain. The write control unit 23 writes data associated with the received write command to the block assigned as the write destination block. The write control unit 23 notifies the host 2 of a user address designated by the received write command and a physical address indicating a location of a block into which the data is written.

When the QoS domain designated by the received write command is a redundant QoS domain, the write control unit 23 executes a data write operation on a plurality of virtual devices used by the redundant QoS domain.

For example, it is assumed that a write command that designates a first logical address and a QoS domain ID of a QoS domain that spans a first virtual device and a second virtual device is received. The write control unit 23 writes data associated with the received write command to a first block selected from a set of blocks included in the first virtual device and a second block selected from a set of blocks included in the second virtual device. The write control unit 23 notifies the host 2 of a first physical address indicating a storage location of the first block into which the data is written, and a second physical address indicating a storage location of the second block into which the data is written, and the first logical address.

When the QoS domain designated by the received write command spans three virtual devices, the data is written into each of the three blocks of the three virtual devices. Three physical addresses indicating three storage locations where the data is written are notified to the host 2 together with a logical address corresponding to the data. Accordingly, the host 2 can manage a plurality of physical addresses where the data corresponding to the logical address is written on a logical address basis by using the LUT 201.

The host 2 selects any one physical address from a plurality of physical addresses associated with a logical address corresponding to data to be read, and transmits a read command for designating the selected physical address to the flash storage device 3.

For example, in response to receiving a read command for designating a first physical address from the host 2, the read control unit 24 reads data from the first block of the first virtual device based on the first physical address. For example, in response to receiving a read command for designating a second physical address from the host 2, the read control unit 24 reads data from the second block of the second virtual device based on the second physical address.

As described above, in the present embodiment, identical data is written into the plurality of virtual devices included in the QoS domain. The plurality of physical addresses into which identical data is written are notified to the host 2. The management of the mapping information indicating the correspondence relationship between the logical address and the physical address is executed by using the LUT 201 of the host 2. The LUT 201 is not an address translation table that translates a logical address to logical addresses of a plurality of write destinations of the flash storage device 3, and is a table that directly translates the logical address to a physical address of the NAND flash memory 5. The host 2 can transmit a read command for designating a physical address corresponding to data to be read to the flash storage device 3. The flash storage device 3 does not need to manage a logical to physical address translation table.

Accordingly, data redundancy can be performed in the flash storage device 3 without performing double address translation including address translation on the host side and address translation on the device side.

Figure 6:
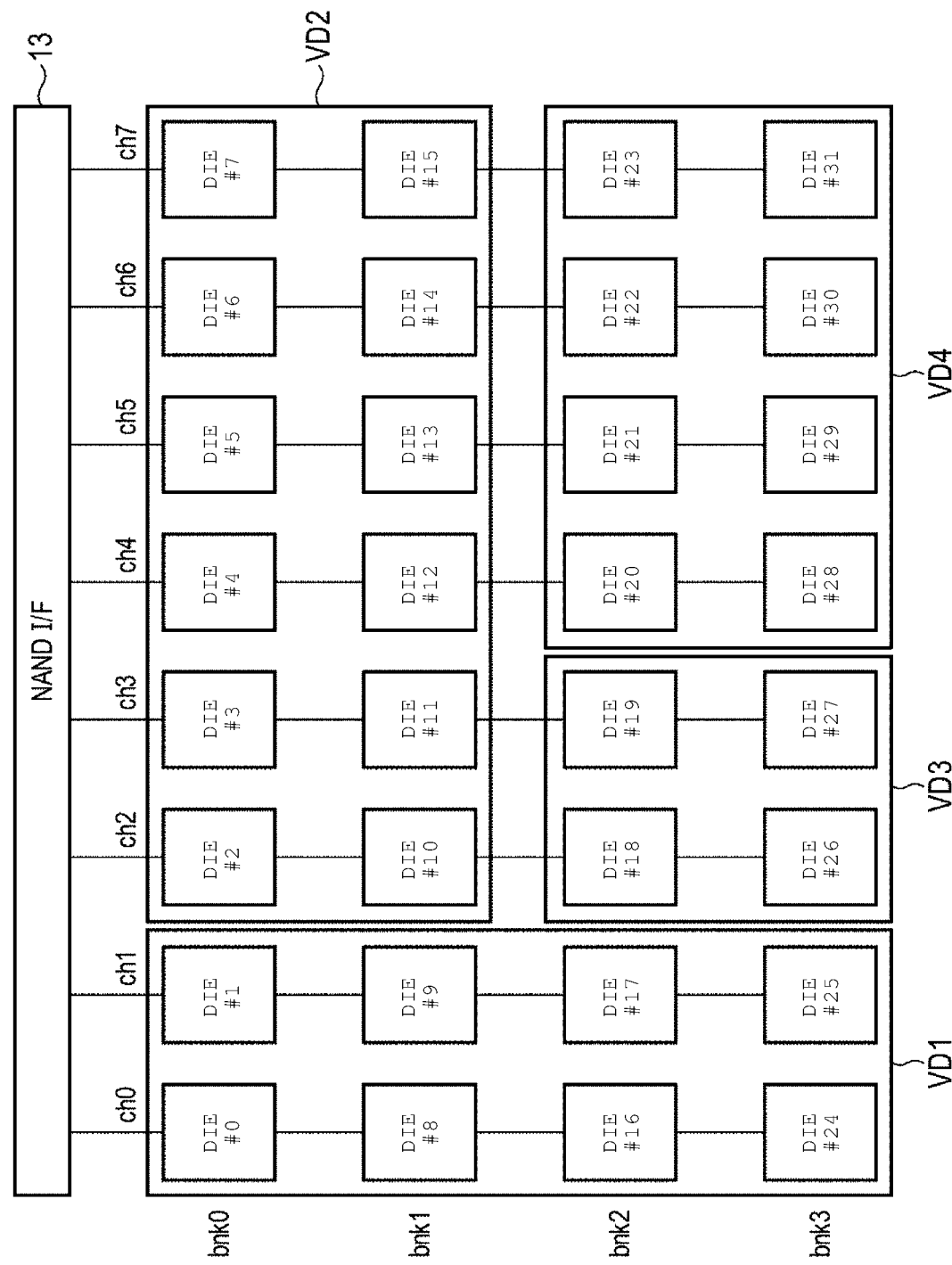
FIG. 6 is a diagram illustrating a configuration example of a virtual device managed in the memory system according to the embodiment.

Next, a configuration of the virtual device will be described. FIG. 6 is a diagram illustrating a configuration example of a virtual device managed in the flash storage device 3 according to the embodiment.

FIG. 6 illustrates a case where four dies are connected to each of eight channels ch0 to ch7. Eight dies #0 to #7 connected to the channels ch0 to ch7, respectively, constitute bank bnk0. Eight dies #8 to #15 connected to channels ch0 to ch7, respectively, constitute bank bnk1. Eight dies #16 to #13 connected to channels ch0 to ch7, respectively, constitute bank bnk2. Eight dies #24 to #31 connected to channels ch0 to ch7, respectively, constitute bank bnk3. The banks are handled as units of bank interleaving, which is an operation of operating dies in parallel.

The virtual device VD1 may include, for example, four dies #0, #8, #16, and #24 connected to a channel ch0 and four dies #1, #9, #17, and #25 connected to a channel ch1.

The virtual device VD2 is, for example, two dies #2 and #10 connected to a channel ch2, two dies #3 and #11 connected to a channel ch3, two dies #4 and #12 connected to a channel ch4, two dies #5 and #13 connected to a channel ch5, two dies #6 and #14 connected to a channel ch6, and two dies #7 and #15 connected to a channel ch7.

The virtual device VD3 includes, for example, two dies #18 and #26 connected to a channel ch2 and two dies #19 and #27 connected to a channel ch3.

The virtual device VD4 is, for example, two dies #20 and #28 connected to a channel ch4, two dies #21 and #29 connected to a channel ch5, two dies #22 and #30 connected to a channel ch6, and two dies #23 and #31 connected to a channel ch7.

When the virtual device VD is created, 32 dies #0 to #31 are handled as two-dimensional areas designated by combinations of the channels and the banks.

When the virtual device VD is created, the two-dimensional area to which a set of dies included in the virtual device VD belongs is designated by a start channel, a start bank, the number of channels, and the number of banks.

The virtual device VD1 is created by designating the start channel=ch0, the start bank=bnk0, the number of channels=2 channels, and the number of banks=4 banks.

The virtual device VD2 is created by designating a start channel ID=ch2, a start bank ID=bnk0, the number of channels=6 channels, and the number of banks=2 banks.

The virtual device VD3 is created by designating the start channel ID=ch2, the start bank ID=bnk2, the number of channels=2 channels, and the number of banks=2 banks.

The virtual device VD4 is created by designating the start channel ID=ch4, the start bank ID=bnk2, the number of channels=4 channels, and the number of banks=2 banks.

Figure 7:
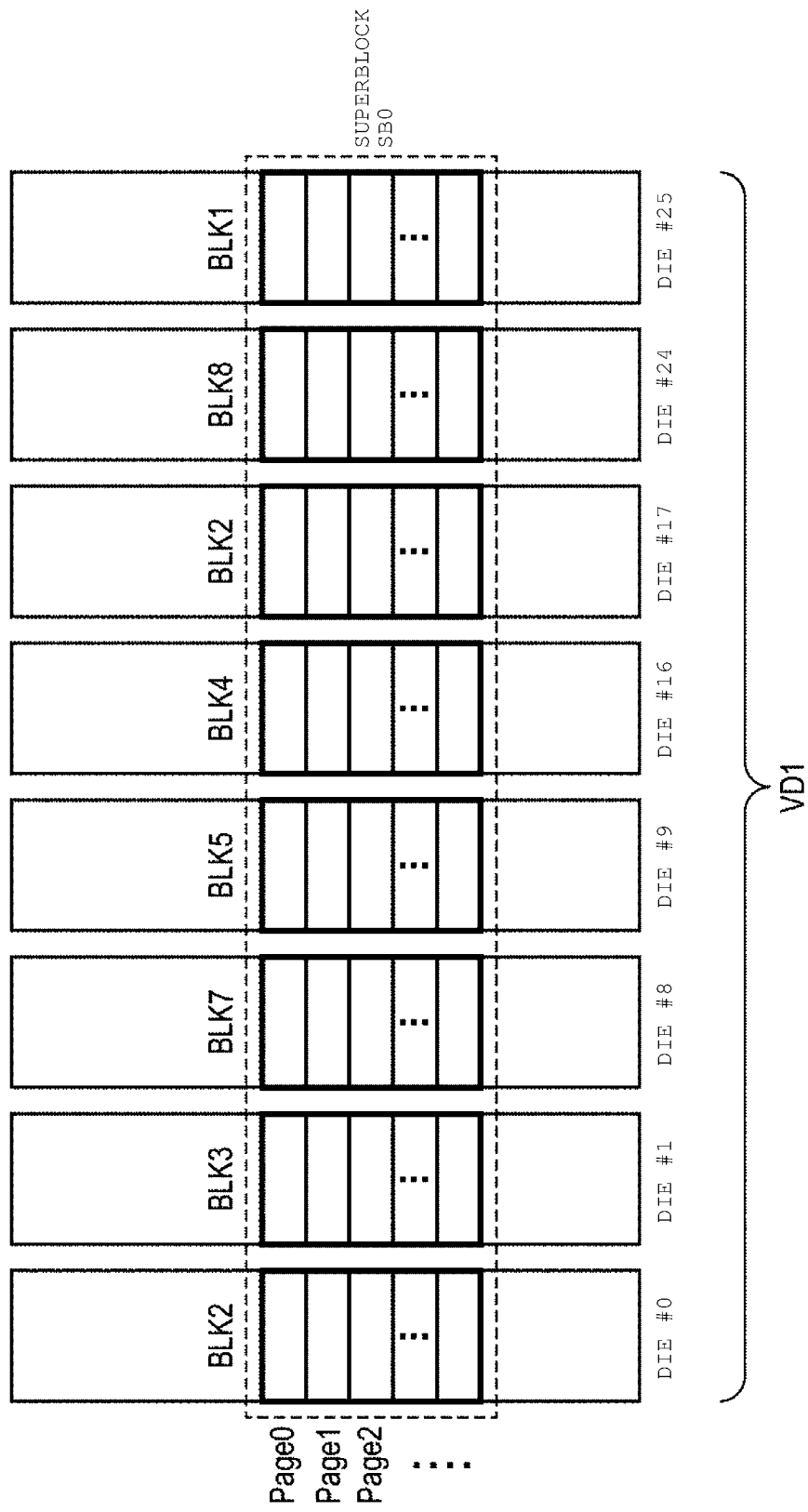
FIG. 7 is a diagram illustrating a configuration example of a superblock included in a first virtual device.

FIG. 7 is a diagram illustrating a configuration example of a superblock included in the virtual device VD1.

The superblock is a set of physical blocks included in all dies included in one virtual device, respectively. The virtual device VD1 includes eight dies #0, #1, #8, #9, #16, #17, #24, and #25. Thus, in the virtual device VD1, the superblock includes, for example, eight physical blocks included in eight dies #0, #1, #8, #9, #16, #17, #24, and #25, respectively. When each die has a two-plane configuration, the superblock includes 16 (=8 dies×2 planes) physical blocks.

Figure 8:
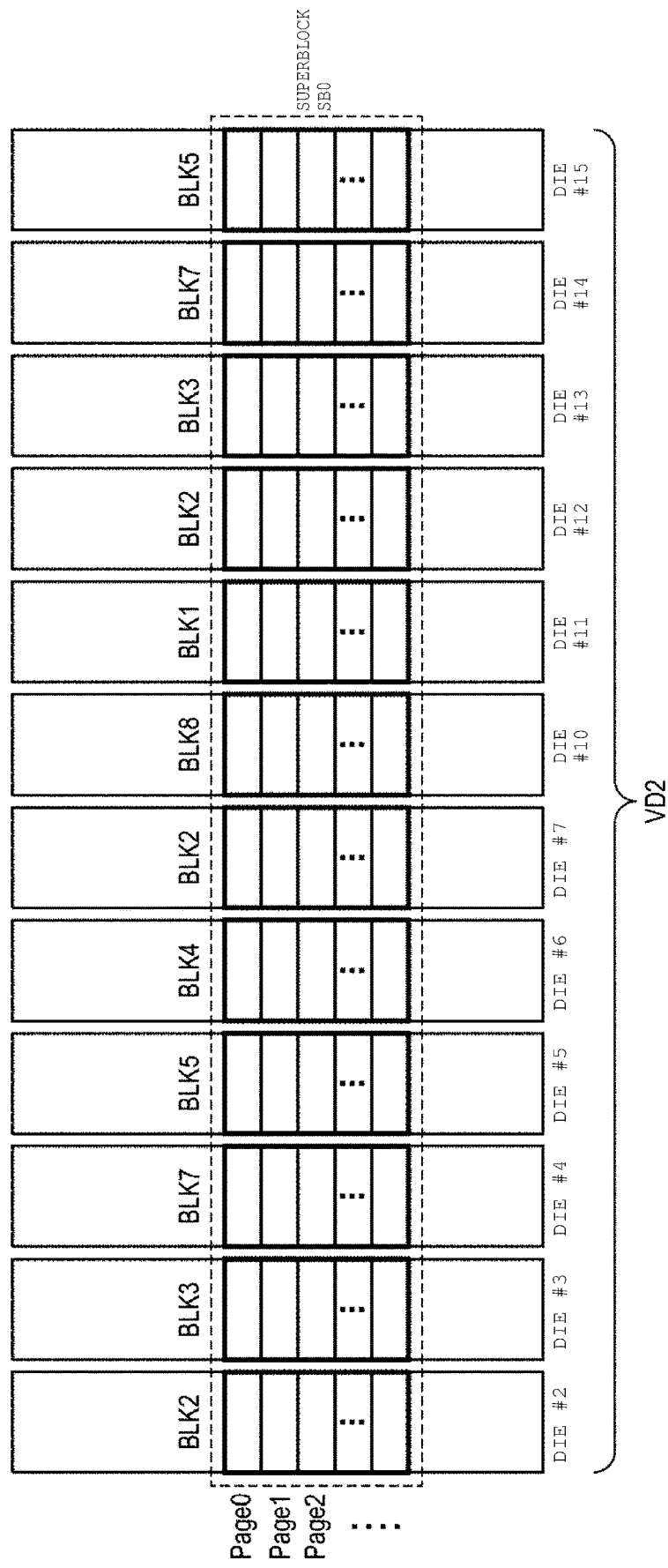
FIG. 8 is a diagram illustrating a configuration example of a superblock included in a second virtual device.

FIG. 8 is a diagram illustrating a configuration example of a superblock included in the virtual device VD2.

The virtual device VD2 includes 12 dies #2 to #7 and #10 to #15. Thus, in the virtual device VD1, the superblock includes, for example, 12 physical blocks included in 12 dies #2 to #7 and #10 to #15, respectively. When each die has a two-plane configuration, the superblock includes 24 (=12 dies×2 planes) physical blocks.

Figure 9:
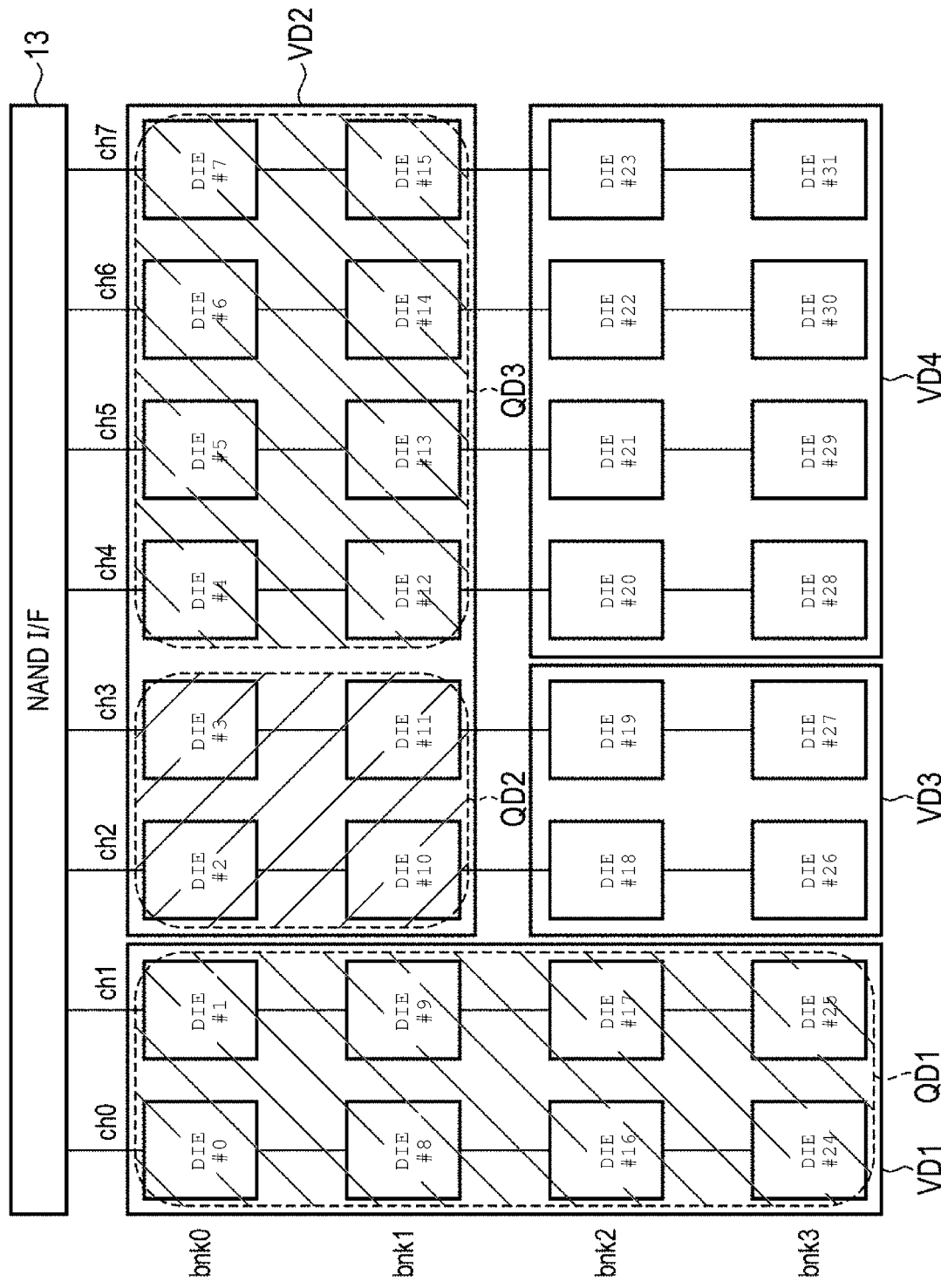
FIG. 9 is a diagram illustrating a configuration example of a non-redundant QoS domain used in the memory system according to the embodiment.

Next, a configuration of a non-redundant QoS domain will be described. FIG. 9 is a diagram illustrating a configuration example of a non-redundant QoS domain managed in the flash storage device 3 according to the present embodiment.

QoS domains QD1 to QD3 are non-redundant QoS domains. One non-redundant QoS domain is created in one virtual device. The QoS domain QD1 is created, for example, in the virtual device VD1. The QoS domain QD2 is created, for example, in the virtual device VD2. When a capacity of the QoS domain QD2 is smaller than a capacity of the virtual device VD2, another QoS domain can be created in the virtual device VD2. The capacity of the QoS domain is represented by the number of sectors. The sector is a data unit having a size such as 4 Kbytes. In FIG. 9, the QoS domain QD3 is created in the virtual device VD2.

When the QoS domain is created, the virtual device used by the QoS domain and the capacity (the number of sectors) are designated. The QoS domain QD1 is created by designating the capacities of the virtual device VD1 and the QoS domain QD1. The QoS domain QD2 is created by designating the capacities of the virtual device VD2 and the QoS domain QD2. The QoS domain QD3 is created by designating the capacities of the virtual device VD2 and the QoS domain QD3.

Figure 10:
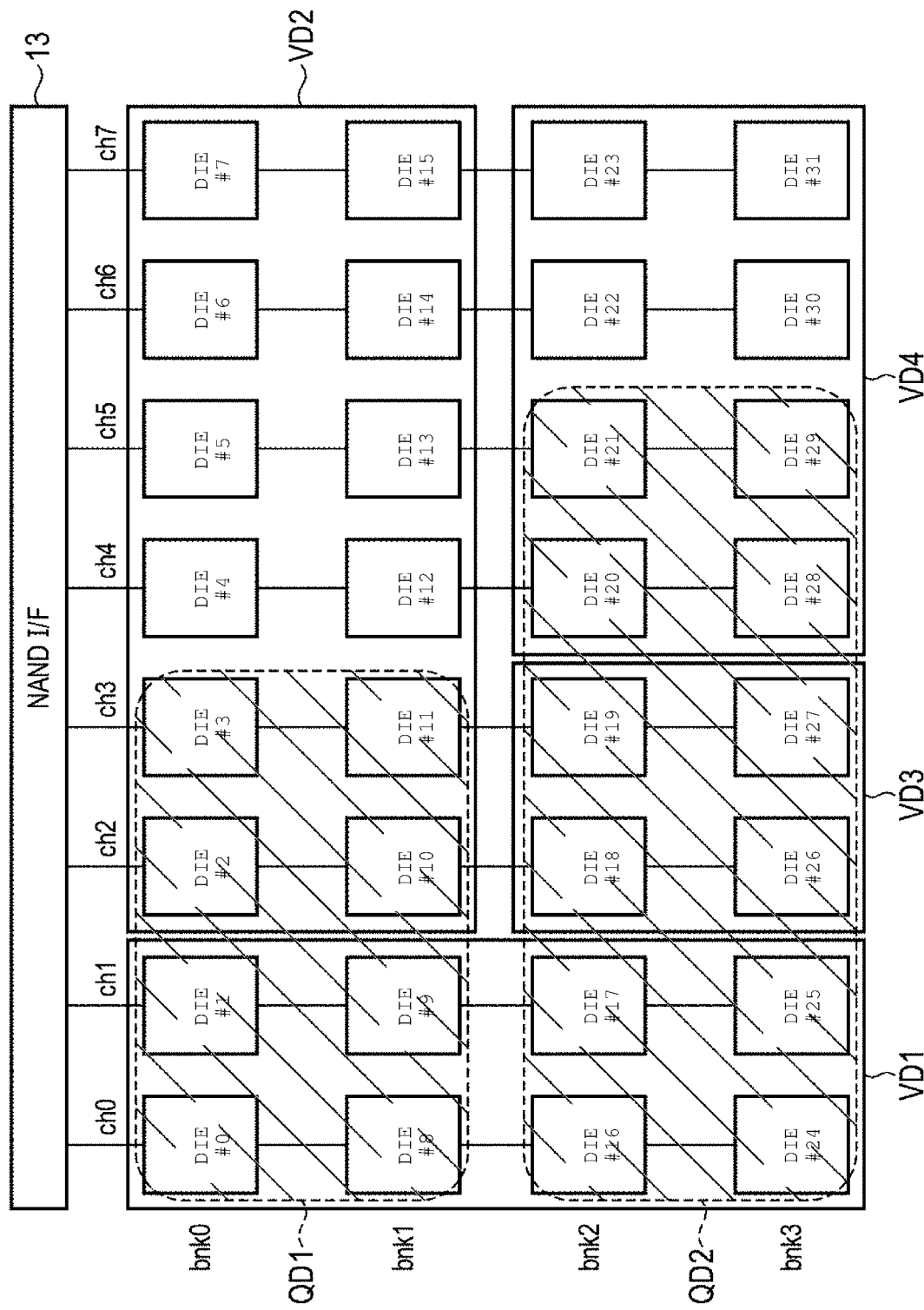
FIG. 10 is a diagram illustrating a configuration example of a redundant QoS domain used in the memory system according to the embodiment.

Next, a configuration of a redundant QoS domain will be described. FIG. 10 is a diagram illustrating a configuration example of a redundant QoS domain managed in the flash storage device 3 according to the embodiment.

The QoS domains QD1 to QD2 are redundant QoS domains. One redundant QoS domain spans a plurality of virtual devices. In other words, one redundant QoS domain is created in each of the plurality of virtual devices. The QoS domain QD1 is, for example, a logical area that spans the virtual device VD1 and the virtual device VD2. The QoS domain QD2 is, for example, a logical area that spans the virtual device VD1, the virtual device VD3, and the virtual device VD4.

When the redundant QoS domain is created, a plurality of virtual devices used by the QoS domain and the capacity (e.g., the number of sectors) are designated. Specifically, the QoS domain QD1 is created by designating the virtual devices VD1 and VD2 and the capacity of the QoS domain QD1. The capacity of the QoS domain QD1 may be designated for each of the virtual devices VD1 and VD2. The QoS domain QD2 is created by designating the virtual devices VD1, VD2, and VD3 and the capacity of the QoS domain QD2. The capacity of the QoS domain QD2 may be designated for each of the virtual devices VD1, VD2, and VD3.

Figure 11:
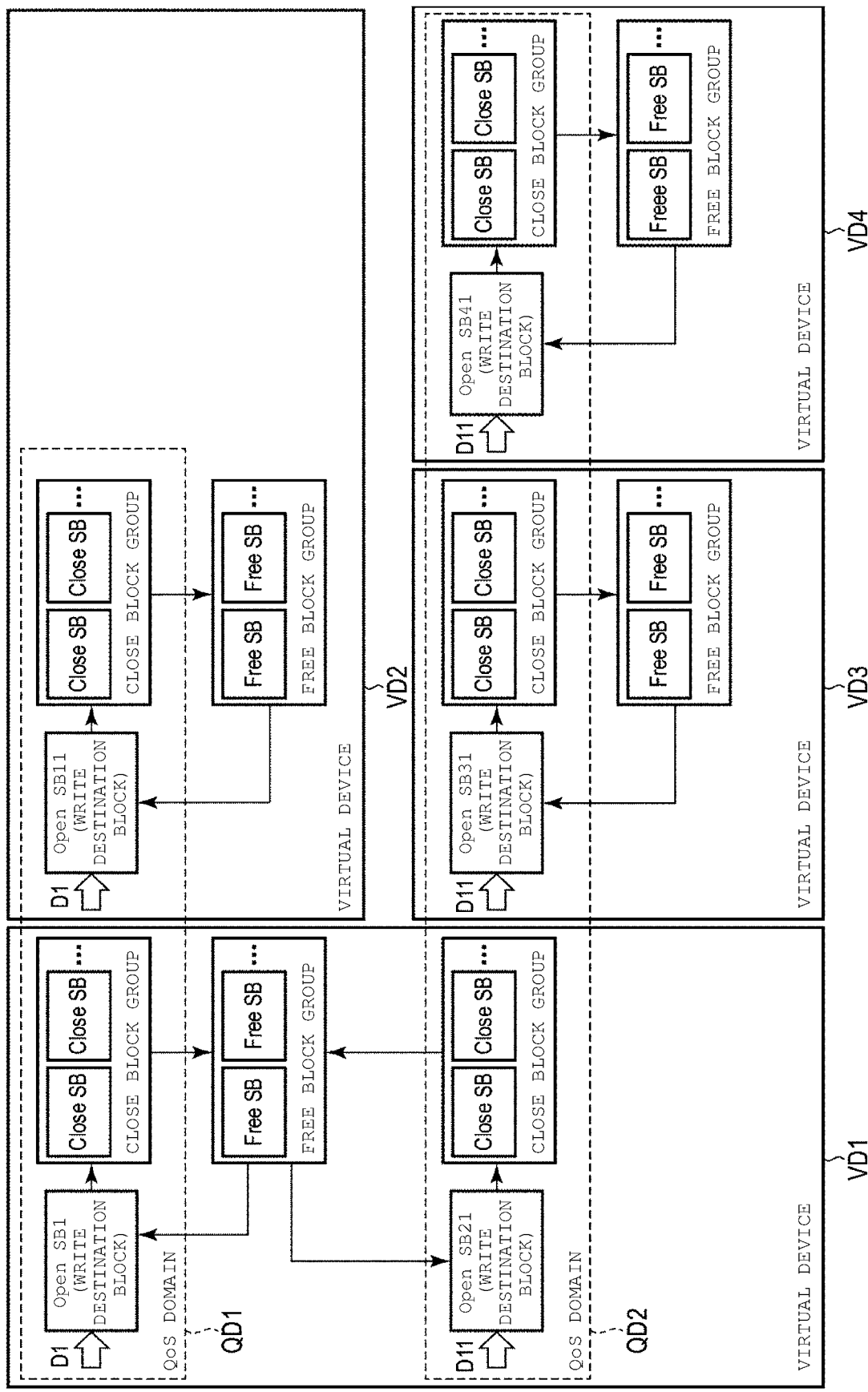
FIG. 11 is a block diagram illustrating an operation of writing data to a plurality of virtual devices included in the redundant QoS domain.

Next, an operation of writing data to the redundant QoS domain will be described. FIG. 11 is a block diagram illustrating an operation of writing data to a plurality of virtual devices included in the redundant QoS domain.

First, the operation of writing the data to the QoS domain QD1 will be described. The QoS domain QD1 spans the virtual device VD1 and the virtual device VD2.

Upon receiving a write command from the host 2 that designates a QoS domain ID of the QoS domain QD1, the controller 4 selects a block (i.e., superblock) from a free block group included in the virtual device VD1. The free block group is a set of free superblocks which are superblocks in a free state. The controller 4 assigns the selected superblock as an open superblock which is a write destination block for the QoS domain QD1. FIG. 11 illustrates a case where an open superblock SB1 is assigned as the write destination block for the QoS domain QD1. When the write destination block for the QoS domain QD1 is previously assigned, it is not necessary to execute an operation of selecting a block from the free block group and an operation of assigning the selected block as the write destination block. Subsequently, the controller 4 determines a write destination storage location of the open superblock SB1 to which data D1 associated with the received write command is to be written. The controller 4 writes the data D1 together with a user address (LBA) designated by the write command to the write destination storage location of the open superblock SB1. When the entire open superblock SB1 is filled with data, a state of the open superblock SB1 transitions to a close state. The superblock SB1 that transitions to the close state is managed as one of close block groups for the QoS domain QD1. The close block group is a set of superblocks in the close state including valid data. When all pieces of valid data stored in the close superblock becomes invalid data by writing update data or garbage collection (i.e., compaction), the state of the superblock transitions to a free state. The superblock that transitions to the free state is managed as one of free block groups of the virtual device VD1. When the host 2 manages valid data and controls garbage collection, the host 2 may transmit a superblock release command for the superblock for which all the pieces of valid data become invalid data, and the controller 4 that receives the superblock release command may transition the state of the superblock to the free state.

The controller 4 executes a write operation for the virtual device VD2 in parallel with the write operation for the virtual device VD1.

Specifically, the controller 4 selects a block (i.e., superblock) from a free block group included in the virtual device VD2. The controller 4 assigns the selected superblock as an open superblock which is a write destination block for the QoS domain QD1. FIG. 11 illustrates a case where an open superblock SB11 is assigned as the write destination block for the QoS domain QD1. The controller 4 determines a write destination storage location of the open superblock SB11 into which the data D1 is to be written. The controller 4 writes the data D1 together with a user address (LBA) designated by a write command to the write destination storage location of the open superblock SB11. When the entire open superblock SB11 is filled with data, the open superblock SB11 is managed as one of close block groups for the QoS domain QD1. When all the pieces of data stored in the close superblock becomes invalid data by writing update data or garbage collection, the state of the superblock transitions to the free state. The superblock that transitions to the free state is managed as one of free block groups of the virtual device VD2.

By doing this, the data D1 is written into the superblock SB1 of the virtual device VD1 and the superblock SB11 of the virtual device VD2.

The controller 4 notifies the host 2 of a physical address indicating the storage location of the superblock SB1 into which the data D1 is written and a physical address indicating the storage location of the superblock SB11 into which the data D1 is written together with a user address (LBA) designated by the received write command. The physical address indicating the storage location of the superblock SB1 into which the data D1 is written is represented by a block address of the superblock SB1 and an intra-block offset of the superblock SB1. The physical address indicating the storage location of the superblock SB11 into which the data D1 is written is represented by a block address of the superblock SB11 and an intra-block offset of the superblock SB11.

Next, an operation of writing data to the QoS domain QD2 will be described. The QoS domain QD2 spans the virtual device VD1, the virtual device VD3, and the virtual device VD4.

Upon receiving from the host 2 a write command that designates a QoS domain ID of the QoS domain QD2, the controller 4 selects a block (i.e., superblock) from the free block group included in the virtual device VD1. The free block group included in the virtual device VD1 is a common block group shared by the QoS domain QD1 and the QoS domain QD2. The controller 4 assigns the selected superblock as an open superblock which is a write destination block for the QoS domain QD2. FIG. 11 illustrates a case where an open superblock SB21 is assigned as the write destination block for the QoS domain QD2. When the write destination block for the QoS domain QD2 is previously assigned, it is not necessary to execute an operation of selecting a block from the free block group and an operation of assigning the selected block as the write destination block. Subsequently, the controller 4 determines a write destination storage location of the open superblock SB21 to which data D11 associated with the received write command is to be written. The controller 4 writes the data D11 together with a user address (LBA) designated by the write command to the write destination storage location of the open superblock SB21. When the entire open superblock SB21 is filled with data, a state of the open superblock SB21 transitions to a close state. The superblock SB21 that transitions to the close state is managed as one of close block groups for the QoS domain QD2. When all pieces of valid data stored in the close superblock becomes invalid data by writing update data or garbage collection (i.e., compaction), the state of the superblock transitions to a free state. The superblock that transitions to the free state is managed as one of free block groups of the virtual device VD1.

The controller 4 executes a write operation for the virtual device VD3 and a write operation for the virtual device VD4 in parallel with the write operation for the virtual device VD1.

In the write operation for the virtual device VD3, the controller 4 selects a block (i.e., superblock) from a free block group included in the virtual device VD3. The controller 4 assigns the selected superblock as an open superblock which is a write destination block for the QoS domain QD2. FIG. 11 illustrates a case where an open superblock SB31 is assigned as the write destination block for the QoS domain QD2. The controller 4 determines a write destination storage location of the open superblock SB31 into which the data D11 is to be written. The controller 4 writes the data D11 together with a user address (LBA) designated by the write command to the write destination storage location of the open superblock SB31. When the entire open superblock SB31 is filled with data, the open superblock SB31 is managed as one of the close block groups for the QoS domain QD2. When all pieces of valid data stored in the close superblock becomes invalid data by writing update data or garbage collection (i.e., compaction), the state of the superblock transitions to a free state. The superblock that transitions to the free state is managed as one of free block groups of the virtual device VD3.

In the write operation for the virtual device VD4, the controller 4 selects a block (i.e., superblock) from a free block group included in the virtual device VD4. The controller 4 assigns the selected superblock as an open superblock which is a write destination block for the QoS domain QD2. FIG. 11 illustrates a case where an open superblock SB41 is assigned as the write destination block for the QoS domain QD2. The controller 4 determines a write destination storage location of the open superblock SB41 into which the data D11 is to be written. The controller 4 writes the data D11 together with a user address (e.g., LBA) designated by the write command to the write destination storage location of the open superblock SB41. When the entire open superblock SB41 is filled with data, the open superblock SB41 is managed as one of the close block groups for the QoS domain QD2. When all pieces of valid data stored in the close superblock becomes invalid data by writing update data or garbage collection (i.e., compaction), the state of the superblock transitions to a free state. The superblock that transitions to the free state is managed as one of free block groups of the virtual device VD4.

By doing this, the data D11 is written into the superblock SB21 of the virtual device VD1, the superblock SB31 of the virtual device VD3, and the superblock SB41 of the virtual device VD4.

The controller 4 notifies the host 2 of a physical address indicating a storage location of the superblock SB21 into which the data D11 is written, a physical address indicating a storage location of the superblock SB31 into which the data D11 is written, and a physical address indicating a storage location of the superblock SB41 into which the data D11 is written together with the user address (LBA) designated by the write command. The physical address indicating the storage location of the superblock SB21 into which the data D11 is written is represented by a block address of the superblock SB21 and an intra-block offset of the superblock SB21. The physical address indicating the storage location of the superblock SB31 into which the data D11 is written is represented by a block address of the superblock SB31 and an intra-block offset of the superblock SB31. The physical address indicating the storage location of the superblock SB41 into which the data D11 is written is represented by a block address of the superblock SB41 and an intra-block offset of the superblock SB41.

Next, the virtual device creation command will be described. FIG. 12 is a diagram illustrating the virtual device creation command issued to the flash storage device 3 according to the present embodiment.

The virtual device creation command is a die group creation command for creating a virtual device (i.e., die group). The virtual device creation command includes parameters that designate a virtual device ID, a start channel, a start bank, the number of channels, the number of banks, and the like.

The virtual device ID is an identifier of the virtual device VD to be created. The start channel is a channel ID of an initial channel of the channels to which the dies included in the virtual device VD to be created are connected, respectively. The start bank is a bank ID of an initial bank of the banks corresponding to the dies included in the virtual device VD to be created, respectively. The number of channels is the number of channels to which the dies included in the virtual device VD to be created are connected, respectively. The number of banks is the number of banks corresponding to the dies included in the virtual device VD to be created, respectively.

Next, the QoS domain creation command will be described. FIG. 13 is a diagram illustrating a QoS domain creation command issued to the flash storage device 3 according to the embodiment.

The QoS domain creation command is a logical area creation command for creating a QoS domain (i.e., logical area). The QoS domain creation command includes parameters that designate a QoS domain ID, a virtual device ID, a capacity, a sector size, and the like.

The QoS domain ID is an identifier of the QoS domain to be created. The virtual device ID is an identifier of the virtual device used by the QoS domain to be created. When the QoS domain to be created is a redundant QoS domain, the QoS domain creation command designates a plurality of virtual device IDs. The capacity is a capacity of the QoS domain to be created. The capacity is represented by the number of sectors. When the QoS domain to be created is a redundant QoS domain, the capacity may be designated on a virtual device basis. The sector size indicates a size of a sector used by the QoS domain to be created. A different sector size can be used on a QoS domain basis. The sector size is, for example, 4 KB.

Next, the write command will be described. FIG. 14 is a diagram illustrating the write command issued to the flash storage device 3 according to the embodiment.

The write command includes parameters that designate a QoS domain ID, a user address, a data size, a data pointer, and the like.

The QoS domain ID is an identifier that can uniquely identify the QoS domain where the data (i.e., write data) is to be written. For example, the write command transmitted from the host 2 in response to a write request from an application corresponding to a certain end user includes a QoS domain ID that designates a QoS domain corresponding to this end user.

The user address is an identifier for identifying the write data. The user address is, for example, a logical address such as an LBA. The logical address indicates an initial logical storage location where the write data is to be written.

The data size indicates a size (i.e., data length) of the write data. The data size is designated, for example, by the number of LBAs (i.e., the number of sectors).

The data pointer indicates a location where the write data is stored in a host write buffer. The host write buffer is the write buffer 404 on the memory 212 provided in the host 2.

Next, processing of notifying the host 2 of the physical address indicating the physical storage location where the write data is written will be described. FIG. 15 illustrates a physical address notification transmitted from the flash storage device 3 to the host 2.

The physical address notification is used to notify the host 2 of the physical address indicating the storage location (i.e., physical storage location) in the NAND flash memory 5 into which the write data associated with the write command is written. This physical address notification includes parameters that designate a QoS domain ID, a user address, a physical address PBA, a data size, and the like.

The QoS domain ID is an identifier of the QoS domain where the write data is written. The user address is a user address included in the write command of FIG. 14. The physical address PBA indicates a physical storage location where the write data associated with the write command is written. The physical address is represented by a block address and an intra-block offset. When the QoS domain where the write data is written is a redundant QoS domain, the physical address notification includes a plurality of physical addresses PBA #1 to PBA #n. The data size indicates a size of the written write data.

Based on the physical address notification received from the flash storage device 3, the host 2 can update the LUT 201 such that a plurality of physical addresses PBA #1 to PBA #n indicating a plurality of storage locations where the write data is written are associated with the user address (e.g., LBA) corresponding to the write data.

Next, the read command will be described. FIG. 16 is a diagram illustrating the read command issued to the flash storage device 3 according to the embodiment.

The read command includes parameters that designate a QoS domain ID, a physical address, a data size, a data pointer, and the like.

The QoS domain ID is an identifier of the QoS domain from which data is to be read. The physical address indicates a physical storage location from which the data is to be read.

The physical address is represented by a block address and an offset. This block address is a block address of the block to be read. The offset indicates a storage location to be read in the block to be read. The data size indicates a size of the data to be read. The data pointer indicates a location to which the read data is to be transferred in the read buffer 405 on the memory 212 of the host 2.

Figure 17:
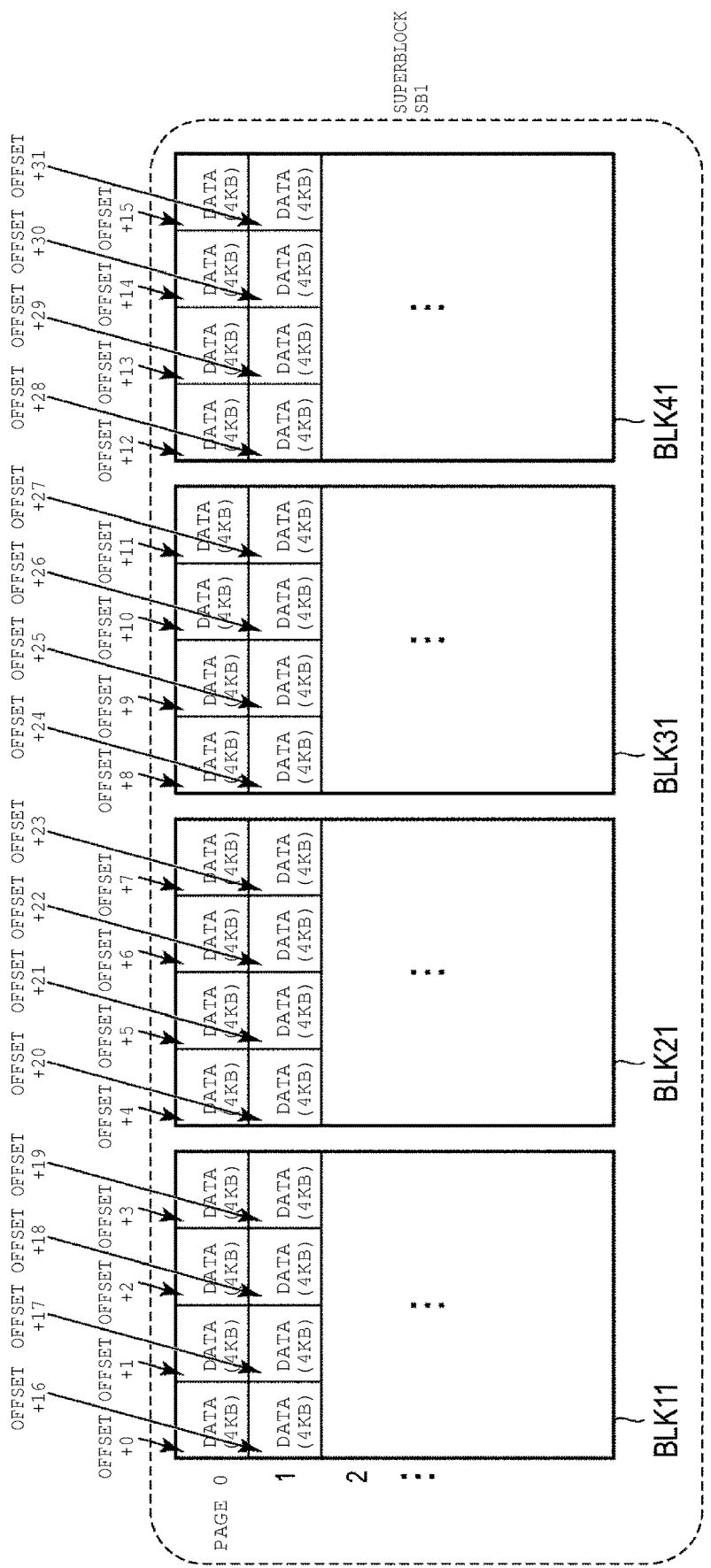
FIG. 17 is a diagram illustrating an example of an intra-block offset of a superblock used in the memory system according to the embodiment.

Next, the intra-block offset will be described. FIG. 17 illustrates a relationship between the block address and the intra-block offset in the case where the superblock is used.

Here, it is assumed that the superblock SB1 includes four physical blocks BLK11, BLK21, BLK31, and BLK41. The block address (superblock address) of the superblock SB1 is SB1. The four blocks BLK11, BLK21, BLK31, and BLK41 are physical blocks selected from the dies included in one virtual device, respectively.

The controller 4 writes data to a page 0 of the block BLK11, a page 0 of the block BLK21, a page 0 of the block BLK31, a page 0 of the block BLK41, a page 1 of the block BLK11, a page 1 of the block BLK21, a page 1 of the block BLK31, and a page 1 of the block BLK41 in this order.

Offset +0 to offset +3 indicate initial four storage locations of the superblock SB1. The initial four storage locations of the superblock SB1 are four 4 KB areas of the page 0 of the block BLK11.

Offsets +4 to +7 indicate next four storage locations of the superblock SB1. The next four storage locations of the superblock SB1 are four 4 KB areas of the page 0 of the block BLK21.

Offsets +8 to +11 indicate further next four storage locations of the superblock SB1. The further next four storage locations of the superblock SB1 are four 4 KB areas of the page 0 of the block BLK31.

Offsets +12 to +15 indicate further another next four storage locations of the superblock SB1. The further another next four storage locations of the superblock SB1 are four 4 KB areas of the page 0 of the block BLK41.

Offsets +16 to +19 indicate further another next four storage locations of the superblock SB1. The further another next four storage locations of the superblock SB1 are four 4 KB areas of the page 1 of the block BLK11.

Figure 18:
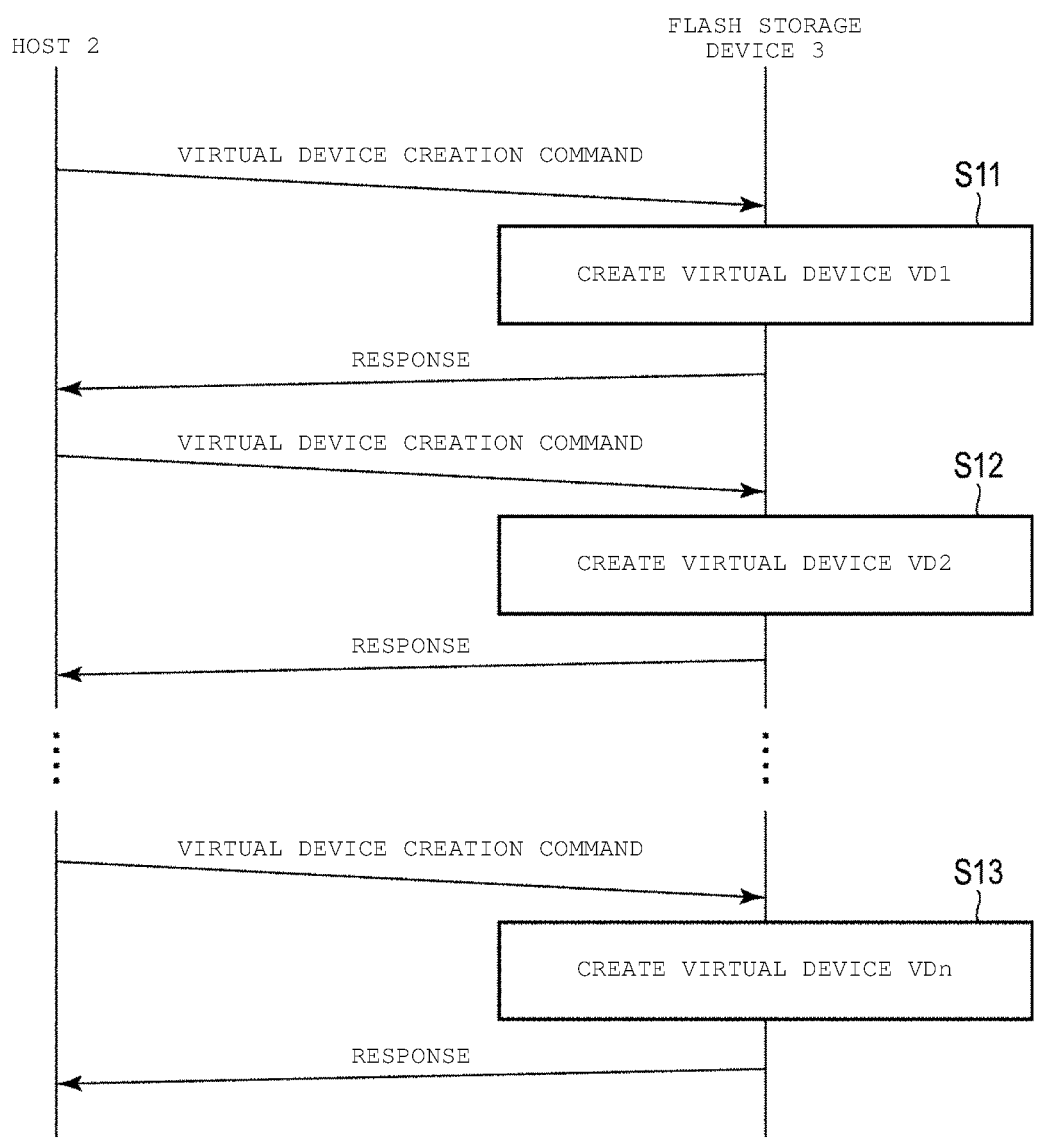
FIG. 18 is a sequence diagram illustrating a procedure of a virtual device creation operation executed in the memory system according to the embodiment.

Next, a virtual device creation operation will be described. FIG. 18 is a sequence diagram illustrating a procedure of the virtual device creation operation executed in the flash storage device 3 according to the present embodiment.

When a virtual device creation command for designating a virtual device ID (=VD1) is received from the host 2, the controller 4 creates a virtual device VD1 including one or more dies designated by the virtual device creation command (step S11). In step S11, the controller 4 determines the dies included in the virtual device VD1 based on the parameters (e.g., the start channel, the start bank, the number of channels, and the number of banks) designated by the virtual device creation command. The controller 4 returns a response about the command completion to the host 2.

When a virtual device creation command for designating a virtual device ID (=VD2) is received from the host 2, the controller 4 creates a virtual device VD2 including one or more dies designated by the virtual device creation command (step S12). In step S12, the controller 4 determines the dies included in the virtual device VD2 based on the parameters (e.g., the start channel, the start bank, the number of channels, and the number of banks) designated by the virtual device creation command. The controller 4 returns a response about the command completion to the host 2.

Similarly, when a virtual device creation command for designating a virtual device ID (=VDn) is received from the host 2, the controller 4 creates a virtual device VDn including one or more dies designated by the virtual device creation command (step S13). In step S13, the controller 4 determines the dies included in the virtual device VDn based on the parameters (e.g., the start channel, the start bank, the number of channels, and the number of banks) designated by the virtual device creation command. The controller 4 returns a response about the command completion to the host 2.

Figure 19:
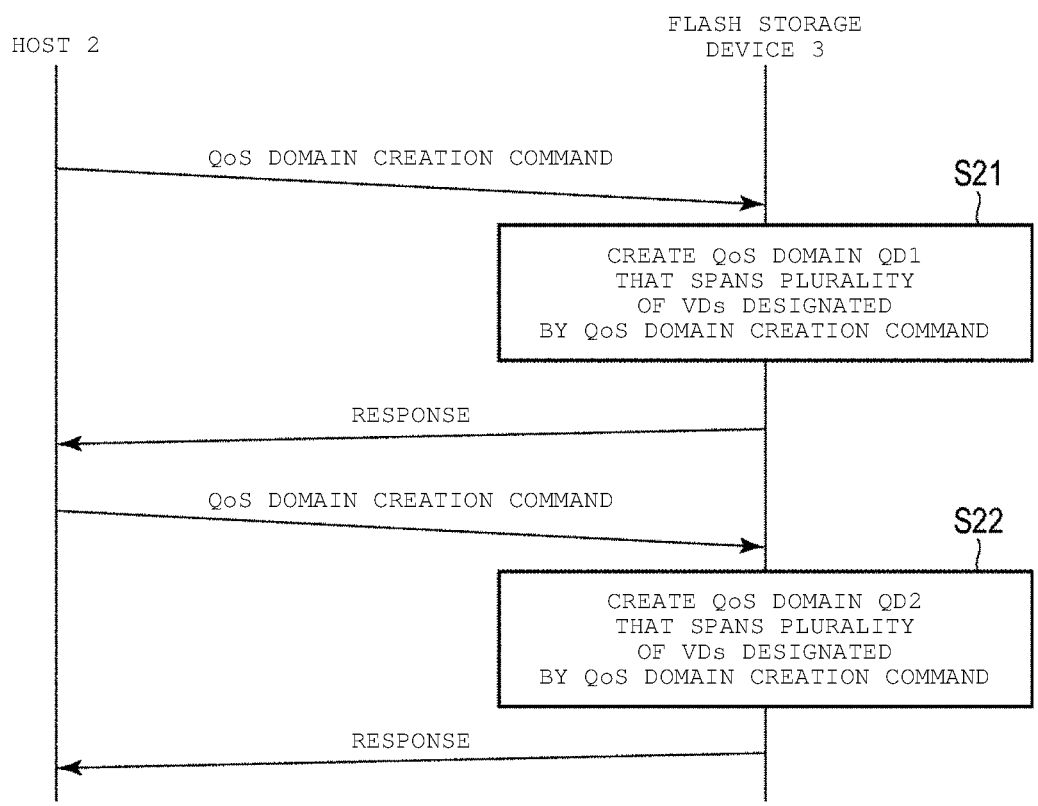
FIG. 19 is a sequence diagram illustrating a procedure of a QoS domain creation operation executed in the memory system according to the embodiment.

Next, a QoS domain creation operation will be described. FIG. 19 is a sequence diagram illustrating a procedure of the QoS domain creation operation executed in the flash storage device 3 according to the present embodiment. Hereinafter, an operation of creating the redundant QoS domain will be described.

When a QoS domain creation command for designating a QoS domain ID (=QD1) is received from the host 2, the controller 4 creates a QoS domain QD1 that spans a plurality of virtual devices VD designated by the QoS domain creation command (step S21). In step S21, the controller 4 executes an operation of allocating (or reserving) the number of blocks designated by the QoS domain creation command for the QoS domain QD1 on a virtual device basis. The controller 4 returns a response about the command completion to the host 2.

When a QoS domain creation command for designating a QoS domain ID (=QD2) is received from the host 2, the controller 4 creates a QoS domain QD2 that spans a plurality of virtual devices VD designated by the QoS domain creation command (step S22). In step S22, the controller 4 executes an operation of allocating (or reserving) the number of blocks designated by the QoS domain creation command for the QoS domain QD2 on a virtual device basis. The controller 4 returns a response about the command completion to the host 2.

Figure 20:
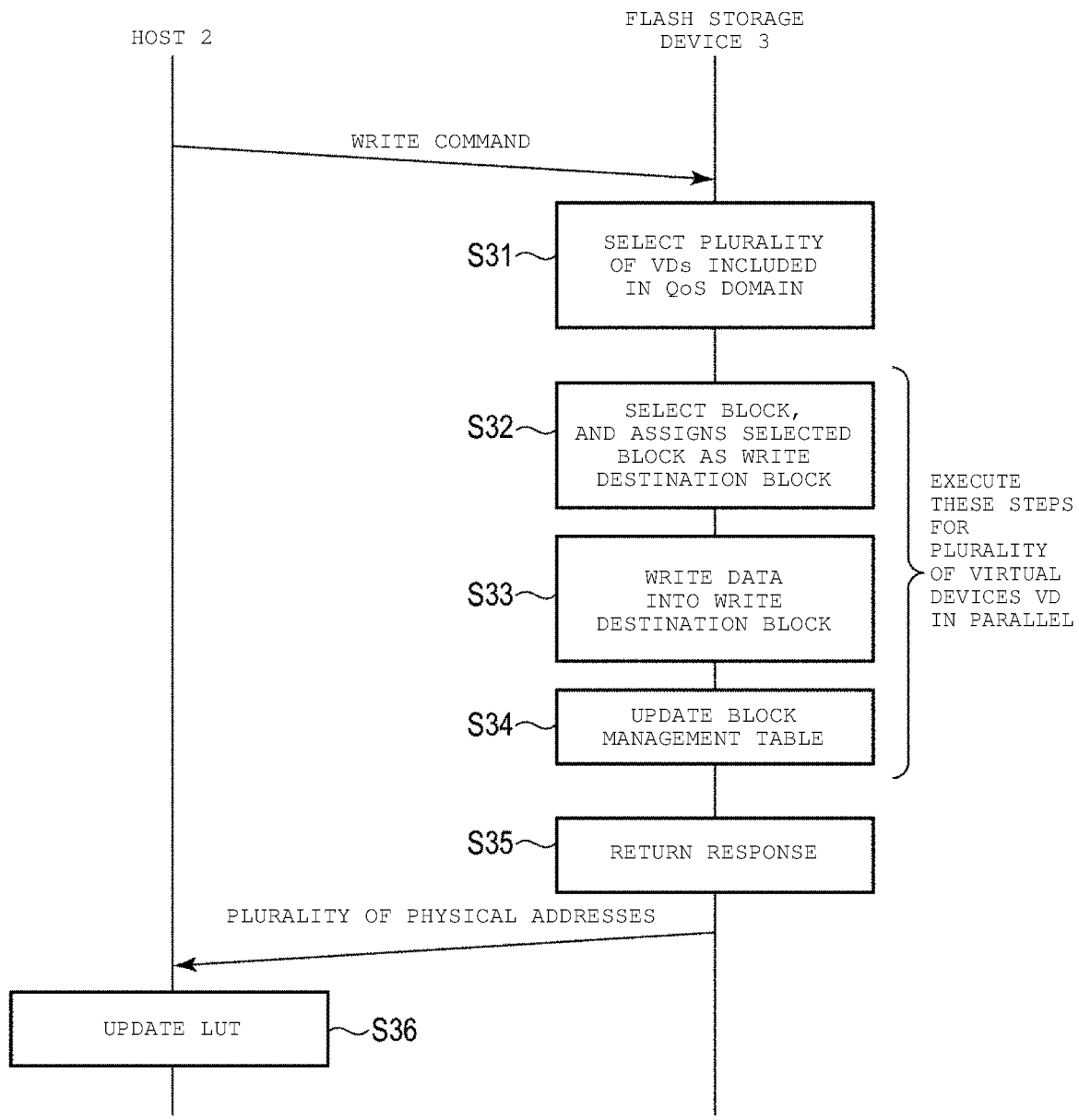
FIG. 20 is a sequence diagram illustrating a procedure of a data write operation executed in the memory system according to the embodiment.

Next, an operation of writing data to the redundant QoS domain will be described. FIG. 20 is a sequence diagram illustrating a procedure of the data write operation executed in the flash storage device 3 according to the embodiment.

Upon receiving the write command from the host 2 that designates a user address, a QoS domain ID, and the like, the controller 4 selects a plurality of virtual devices VD included in the QoS domain having the designated QoS domain ID (step S31). In step S31, the controller 4 selects all virtual devices VD included in the QoS domain. When the write command includes parameters that designate the number of redundancy (i.e., the number of virtual devices into which data is to be written), the controller 4 may select the designated number of virtual devices VD.

The controller 4 executes the following data write operation on a selected virtual device VD basis.

The controller 4 selects one block from the block group included in the selected virtual device VD, and assigns the selected block as the write destination block for the QoS domain designated by the received write command (step S32).

The controller 4 writes the data associated with the received write command to the write destination block together with the user address (e.g., LBA) designated by the received write command (step S33).

The controller 4 updates a bitmap flag stored in the block management table 32 corresponding to the write destination block such that the bits corresponding to the storage locations in the write destination block into which the data is written, respectively, is changed to a value indicating validity (step S34).

The data write operations of steps S31 to S34 are executed in parallel for the plurality of selected virtual devices VD.

As a response indicating the completion of the write command, the controller 4 returns, to the host 2, the plurality of physical addresses indicating the storage locations in the plurality of virtual devices VD into which the data is written, respectively, together with the user address (e.g., LBA) designated by the received write command (step S35).

The host 2 updates the LUT 201 such that the plurality of physical addresses are associated with the user address (e.g., LBA) (step S36).

Next, a configuration of the LUT 201 will be described. FIG. 21 is a diagram illustrating a configuration example of the LUT 201, which is the address translation table managed by the host 2.

The LUT 201 includes a plurality of entries corresponding to LBA0 to LBAn, respectively. Each of the plurality of entries includes a plurality of address storage areas. When a plurality of physical addresses corresponding to the LBAs are received from the flash storage device 3, the host 2 stores the received physical addresses in the plurality of address storage areas of the entry corresponding to the received LBA. In FIG. 21, a case where physical addresses PBA10 and PBA100 are stored in the entry corresponding to the LBA0, physical addresses PBA11 and PBA101 are stored in the entry corresponding to LBA1, . . . , and physical addresses PBA32 and PBA302 are stored in the entry corresponding to the LBA5 is illustrated.

Figure 22:
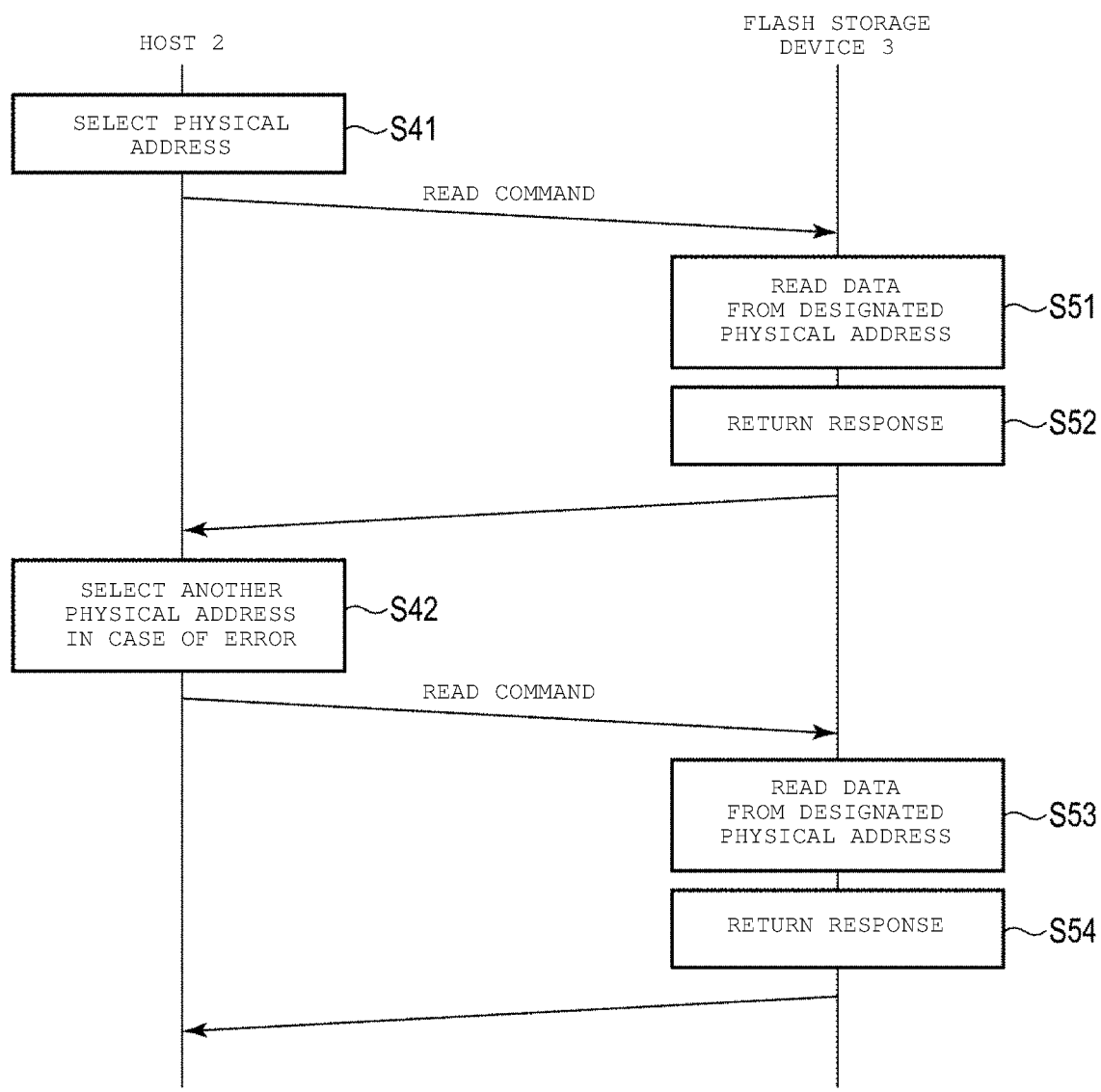
FIG. 22 is a sequence diagram illustrating a procedure of a data read operation executed in the memory system according to the embodiment.

Next, the data read operation will be described. FIG. 22 is a sequence diagram illustrating a procedure of the data read operation executed in the flash storage device 3 according to the present embodiment.

The host 2 selects any physical address from the plurality of physical addresses associated with the user address (e.g., LBA) corresponding to the data to be read, and transmits a read command for designating the selected physical address to the flash storage device 3 (step S41).

Upon receiving the read command from the host 2, the controller 4 of the flash storage device 3 reads data from the non-volatile memory 5 based on the physical address designated by the received read command (step S51).

The controller 4 returns a response indicating the completion of the read command to the host 2 (step S52). When the data can be successfully read from the non-volatile memory 5, the controller 4 returns the read data and a response indicating the success of the processing of the read command to the host 2. On the other hand, the data cannot be successfully read from the non-volatile memory 5, and the controller 4 returns a response indicating an error to the host 2.

Upon receiving the response indicating the error from the flash storage device 3, the host 2 selects another physical address from the plurality of physical addresses associated with the user address (e.g., LBA) corresponding to the data to be read, and transmits the read command for designating the selected physical address to the flash storage device 3 (step S42).

Upon receiving the read command from the host 2, the controller 4 of the flash storage device 3 reads data from the non-volatile memory 5 based on the physical address designated by the received read command (step S53).

The controller 4 returns a response indicating the completion of the read command to the host 2 (step S54).

As described above, according to the present embodiment, the QoS domain QD that spans the plurality of virtual devices VD is created. When the write command for designating the QoS domain ID of this QoS domain QD is received from the host 2, the data associated with the write command is written into the first block selected from the set of the blocks of the first virtual device VD1 included in the QoS domain QD and the second block selected from the set of blocks of the second virtual device VD2 included in the QoS domain QD. The physical address indicating the storage location of the first block into which the data is written and the physical address indicating the storage location of the second block into which the data is written are notified to the host 2 together with the LBA designated by the write command. Accordingly, the host 2 can achieve the data redundancy without translating the logical addresses corresponding to the write data to the plurality of logical addresses indicating the logical storage locations of the write destinations in the flash storage device 3, respectively. The management of the mapping information indicating the correspondence relationship between the logical address and the physical addresses is executed by using the LUT 201 of the host 2. The flash storage device 3 does not need to manage the logical to physical address translation table.

Accordingly, the data redundancy can be achieved without performing double address translation including address translation on the host 2 side and address translation on the flash storage device 3 side. Thus, data reliability and I/O performance can be improved.

While certain embodiments have been described, these embodiments have been presented by way of example only, and are not intended to limit the scope of the disclosure. Indeed, the novel embodiments described herein may be embodied in a variety of other forms; furthermore, various omissions, substitutions, and changes in the form of the embodiments described herein may be made without departing from the spirit of the disclosure. The accompanying claims and their equivalents are intended to cover such forms or modifications as would fall within the scope and spirit of the disclosure.

What is claimed is:

1. A method for controlling a nonvolatile memory having a plurality of memory dies, each of the plurality of memory dies being accessible through one of a plurality of channels and assigned to one of a plurality of groups, the method comprising:

in response to receiving, from a host, a first die group creation command that specifies a first channel identifier of one of the plurality of channels and a first group identifier of one of the plurality of groups, creating a first die group with a first part of the memory dies, the first part corresponding to one or more dies specified with the first channel identifier and the first group identifier;

in response to receiving, from the host, a second die group creation command that specifies a second channel identifier of one of the plurality of channels and a second group identifier of one of the plurality of groups, creating a second die group with a second part of the memory dies, the second part corresponding to one or more dies specified with the second channel identifier and the second group identifier;

creating a redundant logical domain spanning one or more memory dies corresponding to the first die group and one or more memory dies corresponding to the second die group; and in response to receiving, from the host, a write command designating the redundant logical domain from a host, storing write data corresponding to the write command in a first region of the first die group and in a second region of the second die group, and returning to the host a response including a first physical address of the first region and a second physical address of the second region.

2. The method according to claim 1, further comprising:
in response to a read command, reading the write data from only one of the first physical address and the second physical address.

3. The method according to claim 1, wherein
each of the plurality of memory dies includes a plurality of blocks,
the first physical address comprises a block address of one of blocks in the first region and an offset indicating a range of the first region, and
the second physical address comprises a block address of one of blocks in the second region and an offset indicating a range of the second region.

4. The method according to claim 1, further comprising:
creating a third die group with a third part of the memory dies;
creating a second redundant logical domain spanning one or more memory dies corresponding to the first die group, one or more memory dies corresponding to the second die group, and one or more memory dies corresponding to the third die group; and
in response to a second write command designating the second redundant logical domain from the host, storing write data corresponding to the second write command in a third region of the first die group, in a fourth region of the second die group, and in a fifth region of the third die group, and returning to the host a second notice including a third physical address of the third region, a fourth physical address of the fourth region, and a fifth physical address of the fifth region.

5. The method according to claim 1, wherein none of the memory dies in the first part is included in the second part, and none of the memory dies in the second part is included in the first part.

6. The method according to claim 1, wherein storing of the write data in the first region and storing of the write data in the second region are carried out concurrently.

7. The method according to claim 1, further comprising:
creating a non-redundant logical domain spanning one or more memory dies corresponding to the first die group, and not to one or more memory dies corresponding to the second die group; and
in response to a third write command designating the non-redundant logical domain from the host, storing write data corresponding to the third write command in a sixth region of the first die group, and returning to the host a response including a sixth physical address of the sixth region.

8. A memory system comprising:
a nonvolatile memory including a plurality of memory dies, each of the plurality of memory dies being accessible through one of a plurality of channels and assigned to one of a plurality of groups; and
a controller configured to:
in response to receiving, from a host, a first die group creation command that specifies a first channel identifier of one of the plurality of channels and a first group identifier of one of the plurality of groups, create a first die group with a first part of the memory dies, the first part corresponding to one or more dies specified with the first channel identifier and the first group identifier;
in response to receiving, from the host, a second die group creation command that specifies a second channel identifier of one of the plurality of channels and a second group identifier of one of the plurality of groups, create a second die group with a second part of the memory dies, the second part corresponding to one or more dies specified with the second channel identifier and the second group identifier;
create a redundant logical domain spanning one or more memory dies corresponding to the first die group and one or more memory dies corresponding to the second die group; and
in response to receiving, from the host, a write command designating the redundant logical domain, store write data corresponding to the write command in a first region of the first die group and in a second region of the second die group, and return to the host a response including a first physical address of the first region and a second physical address of the second region.

9. The memory system according to claim 8, wherein the controller is further configured to:
create a third die group with a third part of the memory dies;
create a second redundant logical domain spanning one or more memory dies corresponding to the first die group, one or more memory dies corresponding to the second die group, and one or more memory dies corresponding to the third die group; and
in response to a second write command designating the second redundant logical domain from the host, store write data corresponding to the second write command in a third region of the first die group, in a fourth region of the second die group, and in a fifth region of the third die group, and return to the host a second notice including a third physical address of the third region, a fourth physical address of the fourth region, and a fifth physical address of the fifth region.

10. The memory system according to claim 8, wherein no logical to physical address conversion is carried out in the memory system.

11. The memory system according to claim 8, wherein the controller is further configured to, in response to a read command, read the write data from only one of the first physical address and the second physical address.

12. The memory system according to claim 8, wherein
each of the plurality of memory dies includes a plurality of blocks,
the first physical address comprises a block address of one of blocks of a memory die corresponding to the first region and an offset corresponding to a range of the first region, and
the second physical address comprises a block address of one of blocks of a memory die corresponding to the second region and an offset corresponding to a range of the second region.

13. The memory system according to claim 8, wherein none of the memory dies in the first part is included in the second part, and none of the memory dies in the second part is included in the first part.

14. The memory system according to claim 8, wherein storing of the write data in the first region and storing of the write data in the second region are carried out concurrently.

15. The memory system according to claim 8, wherein the controller is further configured to:
  create a non-redundant logical domain spanning one or more memory dies corresponding to the first die group, and not to one or more memory dies corresponding to the second die group; and
  in response to a third write command designating the non-redundant logical domain from the host, store write data corresponding to the third write command in a sixth region of the first die group, and return to the host a response including a sixth physical address of the sixth region.

\* \* \* \* \*